United States Patent
Roth et al.

(10) Patent No.: US 10,863,858 B2
(45) Date of Patent: *Dec. 15, 2020

(54) METHOD FOR OPERATING A BEVERAGE PREPARATION MACHINE AND BEVERAGE PREPARATION MACHINE FOR CARRYING OUT SUCH A METHOD

(71) Applicant: Franke Kaffeemaschinen AG, Aarburg (CH)

(72) Inventors: Sascha Roth, Schoftland (CH); Robin Franke, Lenzburg (CH)

(73) Assignee: Franke Kaffeemaschinen AG, Aarburg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,921

(22) Filed: Feb. 22, 2019

(65) Prior Publication Data
US 2019/0320841 A1    Oct. 24, 2019

Related U.S. Application Data

(63) Continuation of application No. 14/760,564, filed as application No. PCT/EP2014/050839 on Jan. 16, 2014, now Pat. No. 10,226,148.

(30) Foreign Application Priority Data

Jan. 17, 2013  (DE) .................. 10 2013 200 686

(51) Int. Cl.
  *A47J 31/44*   (2006.01)
  *B67D 1/00*    (2006.01)
  (Continued)

(52) U.S. Cl.
  CPC ........... *A47J 31/4403* (2013.01); *A47J 31/00* (2013.01); *A47J 31/40* (2013.01); *B67D 1/0041* (2013.01); *G07F 13/065* (2013.01)

(58) Field of Classification Search
  CPC ..... G07F 13/065; G07F 9/023; B67D 1/0041; B67D 1/0888
  See application file for complete search history.

(56) References Cited

U.S. PATENT DOCUMENTS 5,235,509 A   8/1993  Mueller et al.
6,759,072 B1  7/2004  Gutwein et al.
(Continued)

FOREIGN PATENT DOCUMENTS

DE        60023196     7/2006
DE     102012200947    7/2013
(Continued)

*Primary Examiner* — Timothy R Waggoner
(74) *Attorney, Agent, or Firm* — Volpe Koenig

(57) ABSTRACT

A method for operating a beverage preparation machine, by which at least one coffee unit for dispensing coffee and an additive unit for dispensing a beverage additive is provided. A plurality of beverage variants are displayed by an at least partly graphical display in a selection mode, and the beverage preparation machine is controlled by a selection of a beverage variant, said selection being carried out by a user, such that the selected beverage variant is automatically prepared and dispensed from an outlet. The invention is characterized in that at least one selection region and a preview region are displayed in an at least partly graphical manner in the selection mode. A plurality of selectable beverage variants are displayed in an at least partly graphical manner in the selection region, and a current selection carried out by the user in the selection region is displayed in an at least partly graphical manner in the preview region. The beverage preparation machine is controlled when a starting element is actuated by the user such that the beverage variant displayed in the selection region is automatically prepared and dispensed from the outlet. The selection (Continued)

region and the preview region are displayed simultaneously in at least one first operating mode of the beverage preparation machine.

12 Claims, 18 Drawing Sheets

(51) Int. Cl.
    *A47J 31/40*     (2006.01)
    *A47J 31/00*     (2006.01)
    *G07F 13/06*     (2006.01)

(56) References Cited

U.S. PATENT DOCUMENTS

| | | | |
|---|---|---|---|
| 7,328,171 | B2 | 2/2008 | Helot et al. |
| 9,218,704 | B2 | 12/2015 | Lim et al. |
| 9,275,507 | B2 | 3/2016 | Wessels |
| 10,226,148 | B2 * | 3/2019 | Roth ............... B67D 1/0041 |
| 2008/0183330 | A1 * | 7/2008 | Monn ............... G07F 9/023 |
| | | | 700/239 |
| 2008/0201241 | A1 | 8/2008 | Pecoraro |
| 2011/0017776 | A1 * | 1/2011 | Metropulos ......... B67D 1/0888 |
| | | | 222/129.1 |
| 2012/0158173 | A1 | 6/2012 | Metropulos et al. |
| 2012/0258216 | A1 * | 10/2012 | Wessels ............... G07F 9/02 |
| | | | 426/231 |
| 2013/0129876 | A1 | 5/2013 | Ye et al. |
| 2014/0040055 | A1 * | 2/2014 | Quartarone ............ G07F 13/06 |
| | | | 705/21 |
| 2015/0082243 | A1 | 3/2015 | Taylor et al. |

FOREIGN PATENT DOCUMENTS

| | | |
|---|---|---|
| EP | 1992263 | 11/2008 |
| JP | H08287325 | 11/1996 |
| JP | 2002288457 | 10/2002 |
| JP | 200525687 | 1/2005 |
| JP | 2005062947 | 3/2005 |
| JP | 2006252191 | 9/2006 |
| JP | 2008234221 | 10/2008 |
| JP | 2013508227 | 3/2013 |
| WO | 02076875 | 10/2002 |
| WO | 2009032874 | 3/2009 |
| WO | 2010123732 | 10/2010 |
| WO | 2011067157 | 6/2011 |
| WO | 2011144049 | 11/2011 |
| WO | 2011147821 | 12/2011 |

\* cited by examiner

Fig. 10

Missing/Fehlend 0,50€
○ ○ ● ○ ○

| 1,50€ Ristretto | 1,50€ Espresso | 1,50€ Black Coffee | 2,50€ Cappuccino |
| 3,50€ Latte Macchiato | 3,00€ Caramel Cappuccino | 3,00€ Vanilla Cappuccino | 4,00€ Caramel Latte Macchiato |
| 4,00€ Vanilla Latte Macchiato | 4,50€ Bailey's Latte Macchiato | 3,50€ Hot Chocolate/ heiße Schokolade | 4,50€ Strawberry Milk/ Erdbeermilch |

…

METHOD FOR OPERATING A BEVERAGE PREPARATION MACHINE AND BEVERAGE PREPARATION MACHINE FOR CARRYING OUT SUCH A METHOD

INCORPORATION BY REFERENCE

This application is a continuation of U.S. application Ser. No. 14/760,564, filed Jul. 13, 2015, which is incorporated herein by reference as if fully set forth.

BACKGROUND

The invention relates to a method for operating a beverage preparation machine and to such a machine.

So-called automatic coffee machines, which prepare and produce coffee beverages automatically, are known for preparing coffee beverages and variants thereof. In this connection it is further known that different beverage variants are created in dependence on the choice of a user, in particular milk is added at a different temperature and consistency (e.g. as milk foam) depending on the selection. The automatic addition of further additives, in particular liquid flavor additives, is also known.

In particular, in the case of professional hospitality, a plurality of different coffee beverage variants is increasingly desired by customers such that the so-called beverage preparation machines are realized in a correspondingly complicated manner, in particular they include a plurality of additive flavors with corresponding supplying units such that, dependent on the choice of the user, a plurality of beverage variants can be automatically prepared and dispensed.

Such a beverage preparation machine is typically operated in such a manner that in a selection mode a plurality of beverage variants is shown graphically by a pictogram, for example coffee, coffee with milk, expresso and latte macchiato and by the user selecting the pictogram assigned to a beverage variant, the beverage preparation machine is controlled in such a manner that the chosen beverage variant is automatically prepared and dispensed from an outlet.

SUMMARY

The object underlying the present invention is to provide a method for operating a beverage machine which is user-friendly and enables simple intuitive operation.

This object is achieved by a method for operating a beverage preparation machine and by a beverage preparation machine having one or move features of the invention. Advantageous developments of the method according to the invention are provided below. The wording of all the claims is hereby included in the description explicitly by reference. The beverage preparation machine according to the invention is realized for carrying out the method according to the invention, preferably for carrying out a preferred embodiment of the method according to the invention.

In the case of a method according to the invention for operating a beverage preparation machine, by which beverage preparation machine at least one coffee unit for dispensing coffee and an additive unit for dispensing a beverage additive is provided, a plurality of beverage variants is displayed in a selection mode by an at least partially graphic display. By a user selecting a beverage variant, the beverage preparation machine is controlled in such a manner that the chosen beverage variant is automatically prepared and dispensed from an outlet.

The essential point is that in the selection mode at least one selection region and a preview region are shown graphically at least in part, a plurality of selectable beverage variants being shown graphically in part in the selection region. A current selection made in the selection region by the user is shown graphically at least in part in the preview region. When the operator actuates a start element, the beverage preparation machine is controlled in such a manner that the beverage variants shown in the selection region are automatically prepared and dispensed from the outlet. The selection region and the preview region, in this connection, are shown simultaneously in at least one first operating mode of the beverage preparation machine.

Once the user has made a selection, the selection region is faded out and the preview region is then shown.

The invention is based on the knowledge of the applicant that the large number of beverage variants desired by the customers is not practically displayable by the previously known methods for operating beverage preparation machines. The method according to the invention, in contrast, enables a high level of flexibility and intuitive user guidance as once the user has selected a beverage variant, the selected beverage variant is shown in the preview region in the selection region. As a result, a larger representation, compared to the representation in the selection region, can be chosen in particular in the preview region and the user intuitively recognizes the selection he made such that incorrect operations are avoided, in particular more information can be imparted to the user by the enlarged representation, for example by additional graphic pictograms.

Nevertheless, the method according to the invention is also intuitively operable. The user intuitively selects a beverage from a number of beverage variants shown in the selection region and finds said beverage again in the preview region. As a result, the user automatically checks whether a correct selection has been made or whether the user really wants to obtain the beverage variant selected beforehand. Automatic beverage preparation and beverage dispensing is not made until the start element has been actuated.

In a preferred manner, at least one second operating mode of the beverage preparation machine is provided where, once the user has made a selection, the selection region is faded out and the preview region is then shown.

The method according to the invention also enables in particular a higher level of flexibility as a result of the selection mode being able to be developed according to selection modes known per se: for example, a plurality of beverage variants can be shown graphically in the manner of tiles. The advantage of the method according to the invention in this respect is that the individual tiles can be chosen to be small such that a larger number of beverage variants can be shown compared to previously known methods as once he has selected a beverage, the user recognizes a possible incorrect selection due to the representation in the preview region and, where applicable, can cancel his selection.

Over and above this, other selection methods can be used, such as, for example, screen slide bars in which the user is able to scroll by a scrolling function between different beverage variants or between different subsets, for example several tile-like representations of different subsets of beverage variants. Such scrolling functions are known as a result of the distribution of tablet PCs and the user will actuate the same intuitively when corresponding pictograms are provided, for example an arrow to the right on the right-hand edge of the screen and/or an arrow to the left on the left-hand edge of the screen, in order to scroll to further representations of sub-groups of the selectable beverage variants. There is the advantage here too that, according to experience, when scrolling through such a plurality of graphic representations a faulty selection is frequently made, that inadvertently a pictogram is selected or due to the limited surface area the user does not recognize the pictogram correctly. Here too, it is ensured in an intuitive manner as a result of the representation of the current selection in the selection region that the user realizes the preview he made and consequently checks it. The actual beverage production is not started until this selection is confirmed by actuating the start element.

As stated beforehand, in the case of the method according to the invention, the selection region and the preview region can be shown simultaneously. However, it is particularly advantageous to show the selection region initially exclusively such that the entire surface area of the display medium, typically a screen, can be used for the selection region and consequently a large number of beverage variants, for example in each case a tile pictogram, can be shown. Once a beverage variant has been selected from the selection region, it is faded out and the preview region appears in which a greatly enlarged representation of a detailed pictogram of the selection made is shown, by way of which the user intuitively and without any important delay recognizes details of his selection and can check them in order either to start the preparation operation by actuating start elements or to return to the selection made prior to this one, i.e. in the present case to the selection region, by a back element which is preferably also shown.

The basic design of the beverage preparation machine according to the invention can be realized according to previously known beverage preparation machines, in particular with regard to the components for preparing coffee products and further additives, in particular milk, milk foam and further additives such as, for example, syrup or other liquids. The addition of additives in powder form in an automatic manner is also possible. The essential point is that the beverage preparation machine according to the invention is realized for carrying out the method according to the invention described beforehand. A screen, in particular a touch screen is preferably provided for this purpose. In particular, a touch screen allows for extremely intuitive operation and offers a high level of variability at the same time as the operating elements are simply shown graphically on the screen and do not provide any fixed physical switches or similar actuating elements of the beverage preparation machine.

In one preferred embodiment of the method according to the invention, the selection mode includes a menu selection mode in which a menu selection region is shown, in a preferred manner shown at least in part graphically. A plurality of selectable beverage menus are preferably shown graphically at least in part in the menu selection region. In this preferred embodiment, the selection is consequently made easier for the user as a result of him initially selecting a menu category that interests him without, in this connection, already having to select the total number of selectable beverage variants. In this case, the possibility of an attractive development which inspires and entices the user, for example by seasonal menus being offered depending on the time of year or corresponding flavors or super-ordinated menus being displayed depending on current flavor development and fashionable trend. For example, a menu selection mode can include the "originals" menu which includes the classic coffee beverages such as preferably coffee, expresso, coffee with milk and cappuccino. A further menu can include "summer creations" for example, which includes cold coffee beverages and/or coffee beverages with fruit flavoring additives. A further menu can be coffee beverages with alcoholic additives, for example.

The method is preferably realized in such a manner that once the user has selected a beverage menu, a subset of beverage variants assigned to said selected beverage menu is shown in the selection region. In particular, it is advantageous that the menu selection region is initially shown exclusively and once a menu has been successfully selected, the menu selection region is faded out and the selection region in one of the previously described variants is shown. As a result, on the one hand the given screen area can be utilized optimally and, on the other hand, confusion on the part of the user is avoided as always only the components that are necessary for the current selection are visible.

In a further preferred embodiment of the method according to the invention, the selection mode includes a quick selection mode in which a plurality of selectively selectable, different beverage variants is shown simultaneously graphically at least in part in the selection region. In the case of said variants, compared to the menu selection mode, only a smaller number of beverage variants are shown so as to be determinable intuitively for the user. It is advantageous, however, that fewer selection operations are necessary such that the user, having selected a beverage variant, sees the same directly in the preview region and is able to start the beverage selection by selecting the start element such that simply two operating operations are necessary. This is sensible, for example, in the case of self-service counters where a quick throughput is desired.

In a preferred embodiment of the afore-mentioned quick selection mode, said embodiment is expanded to the effect that a scrolling function as described beforehand is provided such that the beverage variants available for selection are divided into several sub-groups, wherein in each case only the beverage variants of a sub-group are shown and the user alternates between the representation of a sub-group and the representation of one or several sub-groups by actuating a scrolling function. Such a scrolling function can be realized in a preferred manner by an arrow to the right being realized on the right-hand screen edge and/or an arrow to the left being realized on the left-hand screen edge in order to scroll to further representations of sub-groups of the selectable beverage variants by actuating the corresponding arrow. The user then selects a beverage variant, as described beforehand, and the selection is shown in the preview region and the beverage output is set in motion by the start element being actuated.

In a further preferred embodiment of the method according to the invention, the selection mode includes a component selection mode in which a plurality of beverage basic variants which are selectable by the user are shown in the selection region. When a beverage basic variant is selected, a plurality of beverage modifications relating to said selected beverage basic variant selectable by the user are displayed in a sub-selection region.

In the case of this preferred embodiment, the desired beverage is composed in the manner of a module system. The essential point in this connection is that initially purely the beverage basic variants are provided to the user such that no confusion is created by representing all possible beverage modifications. The modifications offered for said beverage basic variant are not displayed until a beverage basic variant has been selected and typically provide a sub-group of the total possible modifications such that the user consequently intuitively selects just the modifications at said selection stage. It is preferably possible for all or some modifications to have provided further sub-modifications which in a corresponding manner are not displayed in a selectable manner for the user until the associated modification has been selected.

In the case of this preferred embodiment, it is particularly advantageous when the preview region is shown simultaneously with the selection region such that the representation in the preview region is always updated in dependence on the selection made by the user in each case, i.e. when the beverage basic variant is selected, just said basic variant is shown in the preview region, when a further modification is selected, this modification is additionally shown such that the user intuitively understands the composition at that moment.

The beverage basic variants preferably include one or several elements, in a preferred manner all the elements of the group—black coffee, expresso, coffee with milk, cappuccino and latte macchiato. The beverage modifications can include flavoring additives, such as, for example, vanilla, strawberry or further flavorings as well as combinations of several flavorings. Along with this or in addition to this, the beverage modifications can include modifications with regard to temperature, for example a modification in such a manner that a cooled coffee beverage or coffee-mix beverage is dispensed. In an advantageous manner, the beverage basic variants are shown in intuitively understandable pictograms, for example coffee in a simple coffee cup, latte macchiato in a glass with a corresponding layering, expresso as an expresso cup. The modifications can be shown in an advantageous manner by pictograms of the respective flavoring, for example vanilla blossoms for vanilla and of the respective fruit, for example of a strawberry for the respective flavoring additive or a snow flake or an ice cube for dispensing a cooled beverage.

The pictograms which are used to show the beverage modifications are preferably added in the preview region when such a beverage modification is selected.

If the user consequently selects the vanilla blossom as beverage modification for example, a vanilla blossom is added to the beverage shown in the preview region, for example to a latte macchiato shown in a glass, such that the user understands intuitively in a simple manner the beverage composition at that moment.

The preparation operation is started by actuating a start element in this variant also.

Back elements are preferably also provided here in order to cancel a selection, in particular the selection of the beverage modification such that the pictogram of the associated beverage modification is no longer displayed either in particular in the preview region when the back element is actuated.

A particularly simple intuitively understandable development is produced by the beverage modification being assigned graphically to the beverage main variant in the manner of a drop-down menu. Once a beverage basic variant has been selected, a list of beverage modifications assigned to said beverage variant and preferably arranged in a row is consequently opened such that the user recognizes intuitively in a simple manner that the beverage modifications shown are assigned specifically to said previously selected beverage basic variant. In a further preferred embodiment of the method according to the invention, operating elements which are selectable by the user for changing the beverage property are shown additionally in the preview region. As a result, after already making his selection of the desired beverage which is shown in the preview region, the user is still able to perform changes to the beverage property by actuating the previously named operating elements. In particular, it is advantageous to show operating elements for changing dispensing volume and/or the type of coffee used and/or the preparation temperature of one or several elements of the beverage and/or for adding a further flavoring. For example, in a preferred manner one or several elements from the group—decaffeinated, small, large, double (double the volume) and low-fat milk can be shown.

Here too, in an advantageous manner the operating elements are shown independently of the selection made and shown in the preview region. I.e., for example when a coffee beverage which does not include milk is selected, correspondingly in the preview region an operating element "low-fat milk" is not shown or is shown as not being selectable (e.g. dark or grey). Here too, it is consequently advantageous to assign to the beverage variants, from the total number of possible modifications in each case, subgroups which are shown in the preview region when the respective beverage variant is selected.

In a further preferred embodiment of the method according to the invention, a plurality of beverage variants is selectable by the user by the selection mode and the selected beverage variants are shown in a job list region as a job list.

In the case of said preferred embodiment, it is consequently not necessary for the user, having selected a desired beverage variant, to have said desired beverage variant actually prepared by the beverage preparation machine by actuating the start element. In the case of said preferred embodiment, the user can select, one after another, several identical or different beverages which are stored in the job list and are also shown in the job list region such that the user always has sight of the chosen beverage variants. In particular, it is advantageous to show the chosen beverage variants in the job list region in the order in which they are selected such that the user is intuitively able to check his selection in a simple manner.

In this connection, once the start element has been selected, the beverage preparation machine is preferably controlled in such a manner that the beverage variant shown first, which is preferably also the first beverage variant selected, is prepared.

In particular, it is advantageous that once the preparation of said beverage variant has been completed, the associated representation is faded out and the beverage variants in the job list selected subsequently are moved up a space. In this way, the user can understand the processing of the job list in a simple and intuitive manner.

The method is preferably realized in such a manner that each beverage variant in the job list has to be started separately by actuating the start element for the preparation. In this way, the user can process an order, for example, initially in such a manner that the desired beverage variants are selected and consequently stored in the job list and are also shown in the job list region. The user can then understand in a simple manner by looking at the job list region the beverage to be prepared next, put a corresponding receptacle (e.g. a small cup for expresso, a glass for latte macchiato) under the outlet and start the preparation by actuating the start element. Once the preparation has been successful, the beverage preparation machine stops and the user can understand visually in a simple manner that the beverage variant which was selected originally as the second one has now moved to the first position in the job list region, put a corresponding receptacle under the outlet and start the second preparation by actuating the start element and repeat said operation until the entire job list has been processed such that all the beverage variants for said order are produced directly one after another and can be served as quickly as possible to the customer in the desired hot or cold state.

At least one element, preferably all the elements in the job list region comprise a delete element and when the user actuates a delete element, the assigned element in the job list is deleted from the job list. As a result, the user can delete individual elements from the job list in a simple manner without the entire operation having to be interrupted. This is advantageous, in particular, if, for example, it becomes clear during the processing of an order that a wrong choice has been made or the customer has changed his mind.

In a further preferred embodiment, the order of the beverage variants in the job list is changeable by the user, in particular by pictograms assigned for graphic movement in the job list region. In the case of said preferred embodiment, the user can consequently change the order of the preparation by simply "moving" the graphic symbols of the respective beverage variants in the job list region.

Due to the graphically supported user guidance, the user is consequently guided in an intuitively understandable and enjoyable manner, in the case of the method according to the invention, to select a desired beverage variant, the risk of wrongly selecting an undesired beverage variant being considerably reduced, in particular as a result of the graphic representation in the preview region and as a result of the possibility, by actuating the corresponding back elements, of correcting, where applicable, a wrong selection. This has a particularly advantageous effect in the first operating mode in the case of applications by a professional user, for example a waiter or a barista who has to input a plurality of orders error-free in a short time into the job list described beforehand.

In a further preferred embodiment of the method according to the invention, the selection mode is realized as a credit mode in which a credit of the user is displayed and a price is assigned to each beverage variant and it only being possible to select such beverage variants the price of which is less than or equal to the credit. In particular, it is advantageous to show such beverage variants, the price of which is less than or equal to the credit, in a highlighted manner, for example brighter or framed in color such that the user recognizes in a simple and intuitive manner the beverage variants that are selectable for his credit at that moment. In particular, it is advantageous that if an attempt is made to select a beverage variant with a price higher than the credit, an error message and/or the shortfall for the selection is displayed.

The preceding description of the method according to the invention and the preferred embodiment shows the high level of flexibility and variability of the invention. Thus, the second operating mode, in particular the afore-described menu selection mode, is suitable for end customers, for example end customers who operate the beverage preparation machine in a self-service area, in a preferred manner in combination with the credit mode. The first operating mode, in particular the component selection mode is particularly suitable for a professional user, for example a waiter or barista. The quick selection mode can be particularly suitable for the end customers and for the professional user.

The method according to the invention is consequently preferably realized in such a manner that a mode from the group—menu selection mode, quick selection mode-, in a preferred manner from the group—selection mode, quick selection mode and component selection mode—can be set by an operator, in particular in a preferred manner by a password-protected default.

In this way, an extremely flexible method is provided which can be adapted individually to the respective situation. The password-protected default, in this case, prevents the desired selection mode being changed unintentionally.

In addition, the method according to the invention is distinguished in that an arbitrary number of beverage variants can be provided for selection with a high level of flexibility. Consequently, a total quantity of beverage variants is provided and from said total quantity a subset is selectable for the operation of the beverage preparation machine such that just said subset of beverage variants is made available to the respective user for selection. As a result, a large number of beverage variants can be provided in an advantageous manner, for example in a work situation, whereas the user or a customer advisor selects a subset of desired beverage variants or beverage variants possible for the respective configuration of the beverage preparation machine from the large number. Here too, a password-protected selection prevents the subset of beverage variants being unintentionally changed.

The representations described above in the different regions, in particular the selection region and the preview region, are preferably effected at least in part in a graphical manner. It is within the framework of the invention to choose completely text-based representation. However, at least partial graphic representation, in particular pictogram-like representation is particularly advantageous as it is understandable intuitively by a user and is independent of his language knowledge. Exclusively graphic representation is particularly advantageous as here a greater information density and representation that is understandable in a visually simple manner is possible.

BRIEF DESCRIPTION OF THE DRAWINGS

Further preferred features and embodiments of the invention are described below by way of the Figures and exemplary embodiments, in which:

FIG. 10 shows an exemplary embodiment of a selection region of the credit mode shown in FIG. 9 with quick selection mode;

DETAILED DESCRIPTION

The arrangement and graphic developments shown in the Figures are given as examples. It is within the framework of the invention to realize the method according to the invention with other arrangements or graphic developments.

Figure 1:
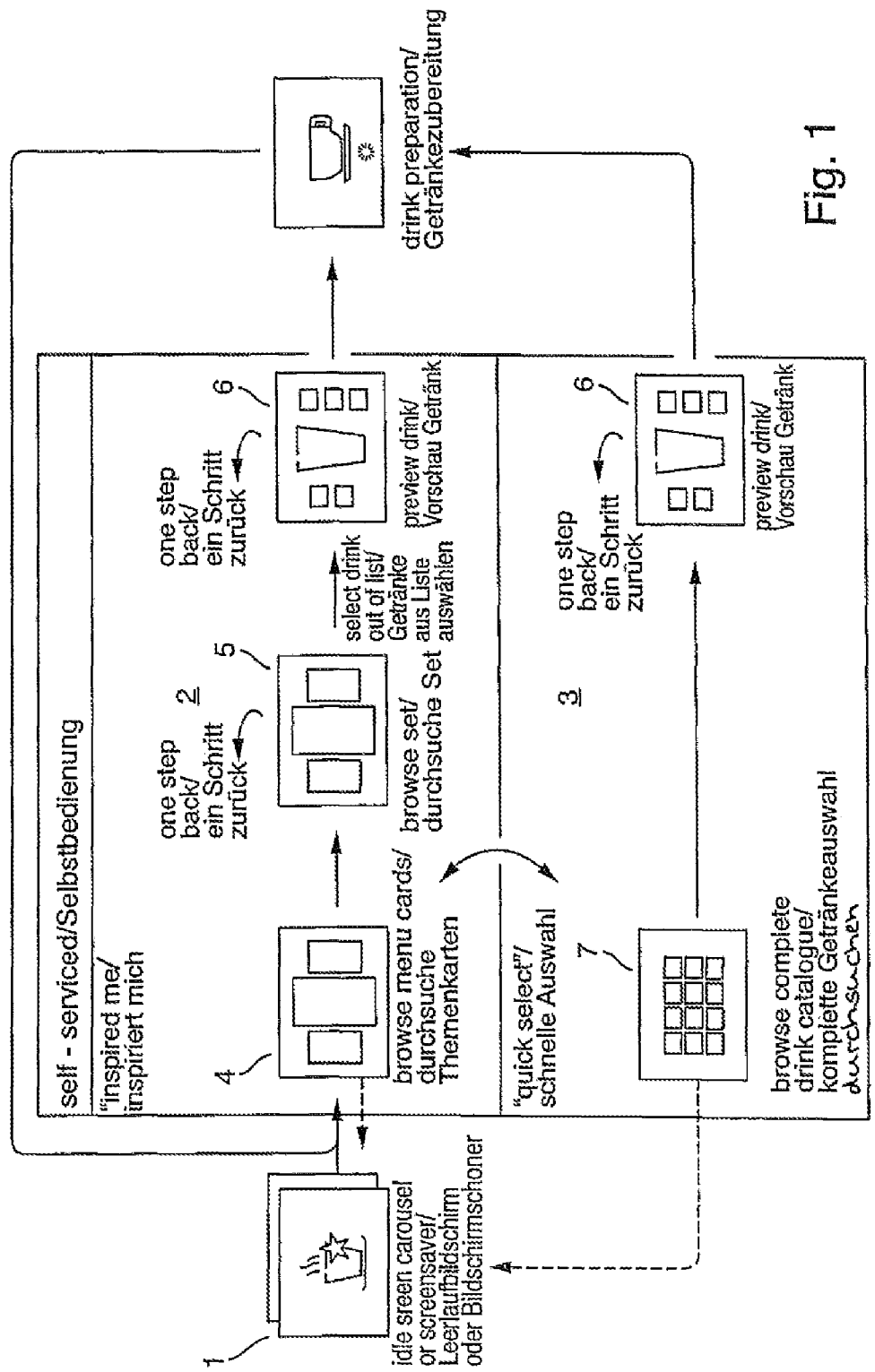
FIG. 1 shows an exemplary embodiment of the method according to the invention where a selection can be made between a menu selection mode and a quick selection mode.

FIG. 1 shows a schematic representation of a flow diagram of an exemplary embodiment of the method according to the invention.

If the beverage preparation machine is not utilized for a predefined period, an idle mode (1) is set up where a graphic display is shown in the manner of a screen saver or several images following one behind another in chronological sequence with a preferential display time, These images shown in idle mode can be advertisements, by way of which the customer calls attention to further products, in particular products of other manufacturers. In a particularly preferred exemplary embodiment, the idle mode can also include different beverage variants or combinations of several beverage variants being shown on the screen and the customer consequently being able to be inspired and attracted by the beverages shown.

In the exemplary embodiment shown in FIGS. 1 to 16, the method is carried out on a beverage preparation machine which includes a touch-sensitive screen. All the screen representations are shown on said touch-sensitive screen and the user can make a selection by touching the corresponding regions in a manner that is known per se.

In the schematic flow sheet shown in FIG. 1, the idle mode 1 (idle screen carousel or screensaver) is shown on the left, in which, as mentioned beforehand, a screensaver or one or several idle mode images which are shown below are displayed. As a result of touching the screen, depending on the default provided by the operator, the user passes either into the menu selection mode 2 (inspire me) shown above or into the quick selection mode 3 (quick select) shown below.

If the operator has provided, for example, the menu selection mode 2, once the user has touched the screen, a menu selection region 4 (browse menu cards) of a selection mode appears. The menu selection region 4 includes several menu cards which are explained below by way of FIG. 2.

Once the user has selected a menu card, a selection region of the selection mode appears, which is realized as a beverage variant selection region 5 (browse set) and in which the subset of beverage variants assigned to the selected menu is shown. This beverage variant selection region 5 is explained in more detail by way of FIG. 3.

The user can then move back to the menu selection region 4 via a back option—one step back—for example insofar as he has not found any suitable beverage variant in the beverage variant selection region 5.

If the user makes a find in the beverage variant selection region 5 and selects a beverage variant, he passes to a preview region 6 (preview drink). In this preview region the selected beverage variant is shown graphically. This is explained in more detail by way of FIG. 4. In addition, the user can make changes in the preview region 6, for example choosing the size of the beverage to be dispensed. By actuating a start element, the beverage preparation machine is controlled automatically in such a manner that the beverage variant chosen by the user is prepared and dispensed (drink preparation).

It is also possible in the preview region to move one step back to the beverage selection region 5 by a corresponding back element.

After the beverage preparation has been concluded, the menu selection region 4 is shown again or after a predefined time period has expired in which no selection has been made, the idle mode 1 is displayed again.

With this method, the user is consequently guided for the first time intuitively and at the same time in an inspiring manner by at least graphically supported menu guidance for the preparation of a beverage variant from a plurality of possible beverage variants.

As an alternative to this, in the case of this exemplary embodiment of a beverage preparation machine according to the invention, the quick selection mode 3 can be provided by the operator as described beforehand.

If the quick selection mode 3 is provided and the user touches the screen in idle mode 1, the selection region is shown as quick selection region 7 (browse complete drink catalogue). In this exemplary embodiment, a plurality of beverage variants are shown to the user in a tile-like manner in the quick selection region 7 and the user can select the corresponding beverage variant in a simple manner by touching lightly on the desired tile, whereupon, in an analogous manner to the preceding description, a preview region 6 is displayed which shows the selected beverage variant graphically to the user. In this preview region, the user can also perform further adjustments, such as for example the beverage size. In the preview region 6 of the menu selection mode 2, the user can preferably choose the size and further components, such as for example further flavoring additives, in contrast in the preview region 6 of the quick selection mode 3 only the size can be changed as all flavorings are already established as a result of the selected beverage variant from the quick selection region 7.

In the quick selection mode 3, in the preview region 6 the user can also return to the quick selection region 7 by a back option (one step back), insofar as he does not want to decide on the displayed beverage variant.

By actuating a start element in the preview region 6 in the quick selection mode 3, the user can also start the beverage preparation (drink preparation), as described beforehand.

Figure 2:
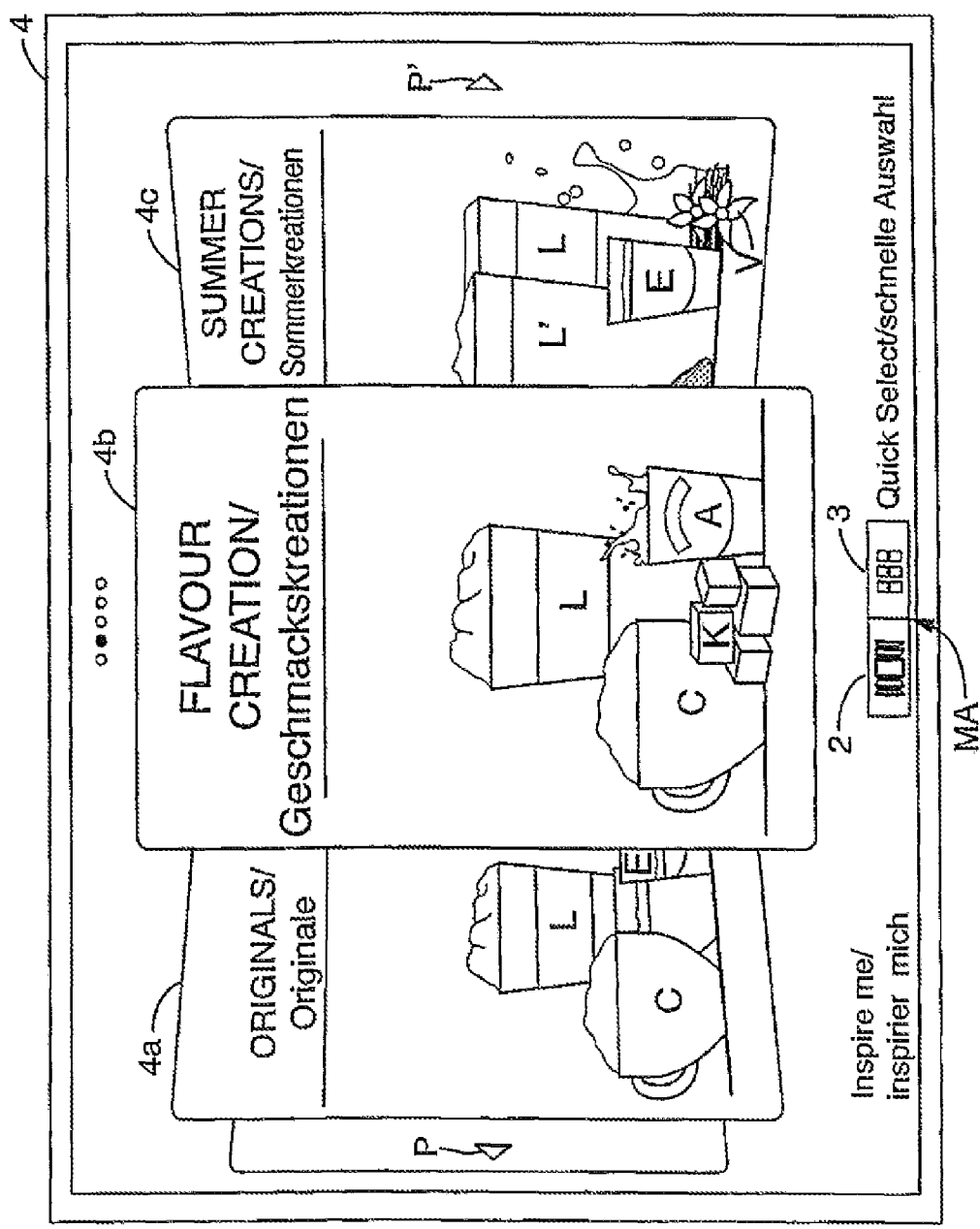
FIG. 2 shows a view of a detail of the menu selection mode.

FIG. 2 then shows an exemplary embodiment of the menu selection region 4, with several menu cards 4*a*, 4*b*, 4*c*. The menu cards provide in each case a subset of the total possible beverage variants, the subset being selected according to a certain menu. In this exemplary embodiment, a originals menu card 4*a* is shown which shows coffee variants that are known per se, such as cappuccino C, latte macchiato L and expresso E in corresponding receptacles and graphic representation of the corresponding components such as milk foam or layer systems of milk, coffee and milk foam. Menu card 4*b* shows as an example a flavor creation menu in which cappuccino C and latte macchiato L are shown additionally with graphic symbols of flavorings, such as for example caramel cubes K and alcoholic additives A, such that the user intuitively understands that, for example, alcoholic beverages or caramel can be found in the case of said flavoring additives menu. Menu card 4*c* shows as an example a summer creations menu. Here latte macchiato L and L' are shown in different colors in order to characterize, for example by pink coloring, the addition of strawberry flavoring which is shown additionally symbolically by a strawberry or to show by the representation of vanilla blossoms V that vanilla can also be selected as a flavoring additive, for example, in the case of said menu.

The user can scroll intuitively to the left (P) or to the right (P') to further menu cards in a manner known per se by arrow operating elements P and P'.

It is also possible in this exemplary embodiment for the user to change between the menu selection mode 2 (inspire me) and the quick selection mode 3 (quick select) in a mode selection region Ma. The user, for example with knowledge of this selection method, can consequently switch into the quick selection mode 3 for quicker selection by selecting the field which is characterized correspondingly by way of the reference 3 in FIG. 4 and shows the tiles of the quick selection mode 3 graphically in a smaller form.

Figure 4:
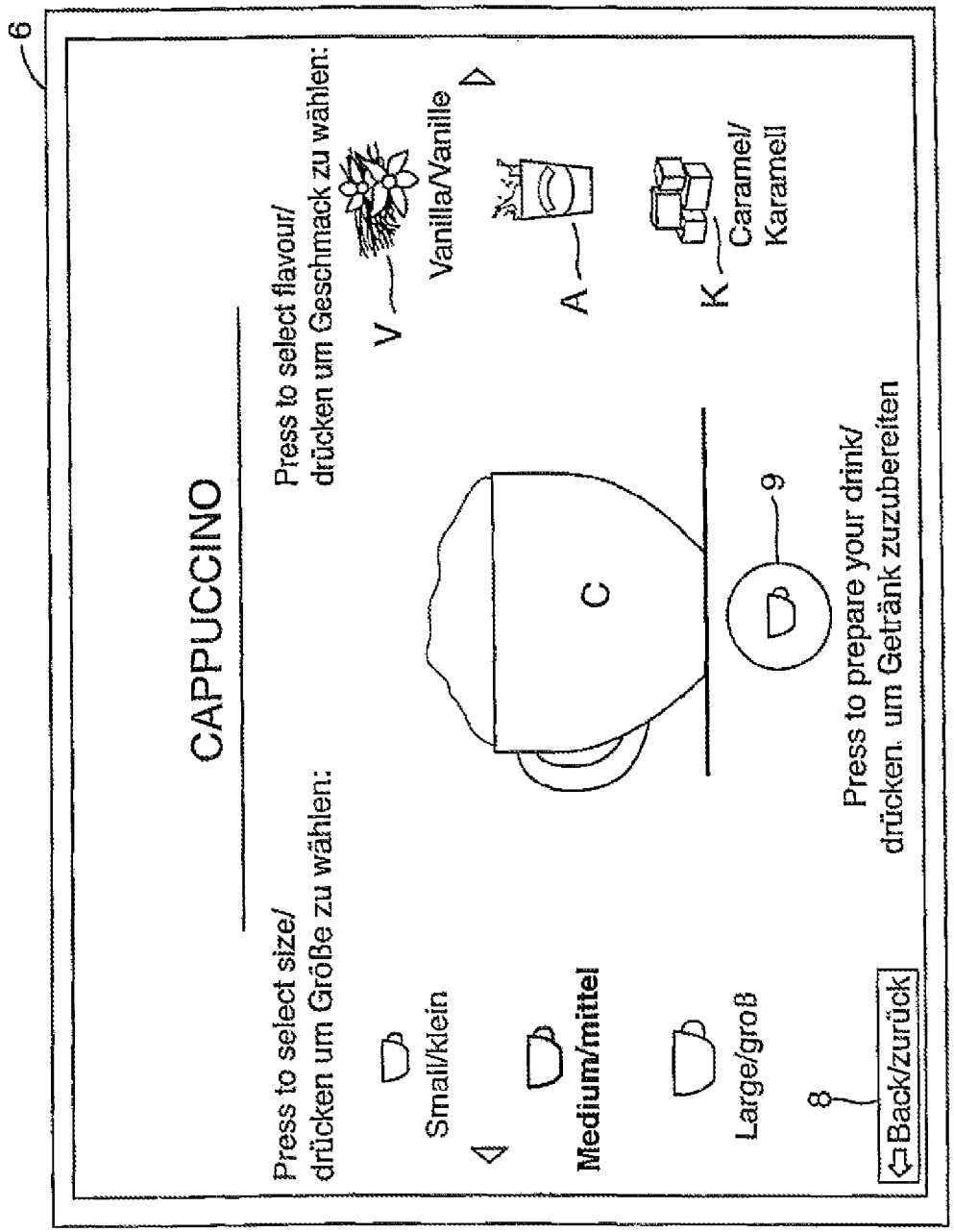
FIG. 4 shows a part view of an exemplary embodiment of a preview region of a menu selection mode.

The menu selection mode 3 with the menu selection cards is also shown in a reduced manner by the field 2 characterized with the reference 2 in FIG. 4 in a smaller form. Here too, the user will consequently perform the suitable operation intuitively without further instruction being necessary as the corresponding operating components are shown graphically in a self-explanatory manner.

A corresponding menu is selected by the user touching lightly in a manner known per se on the corresponding menu card, for example menu card 4b.

Figure 3:
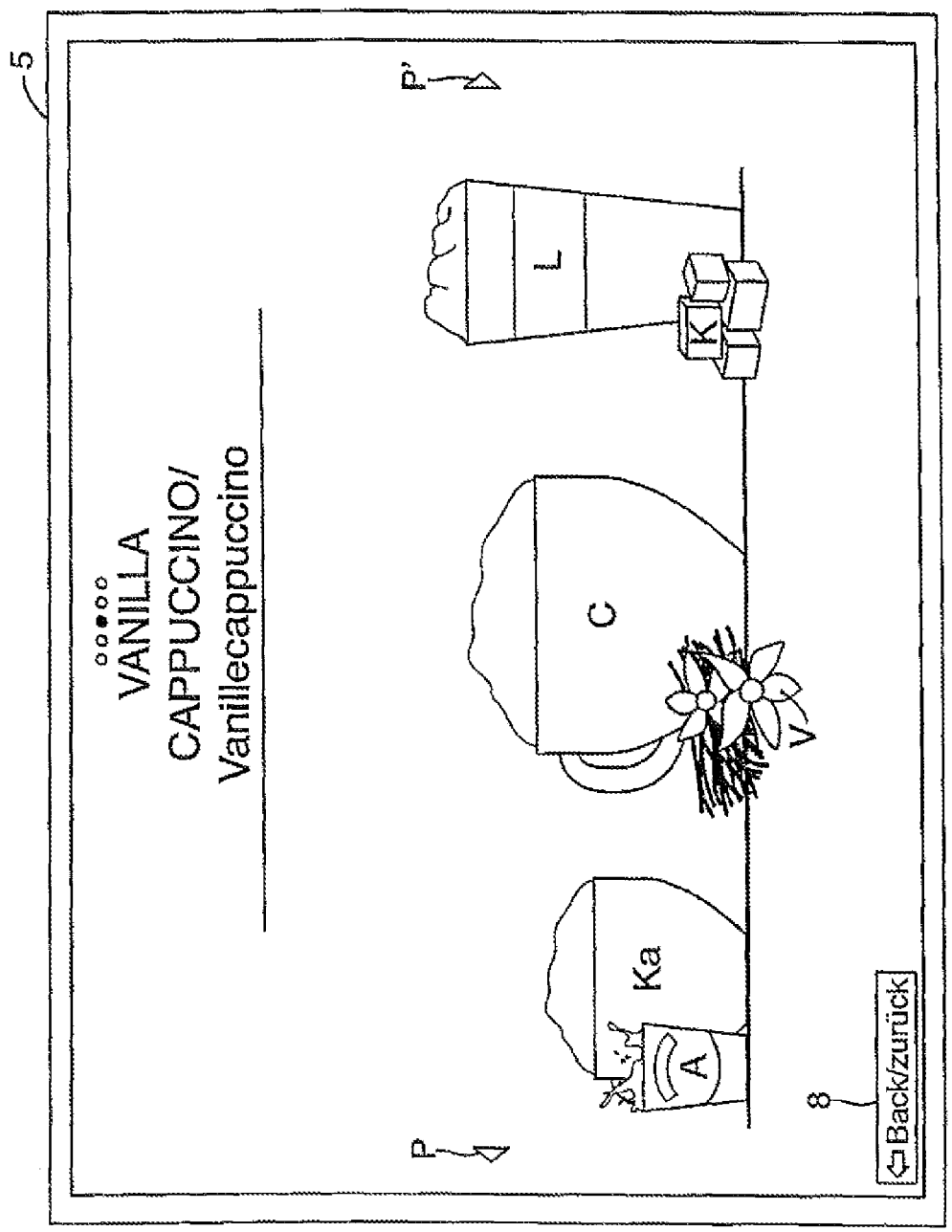
FIG. 3 shows a part view of an exemplary embodiment of a beverage variant selection region.

FIG. 3 shows an exemplary embodiment of a beverage variant selection region 5, as explained in FIG. 1 for the menu selection mode 2.

The subset of beverage variants assigned to the selected menu is shown to the user in the beverage variant selection region 5. A cappuccino C with vanilla blossoms V is shown centrally, for example, in FIG. 3 such that the user perceives directly and intuitively that said beverage variant consequently shows cappuccino with vanilla flavoring. In addition to this, the beverage variant shown centrally in each case is once again named in the upper region in plain language, in the present case vanilla cappuccino.

Coffee Ka is shown with an alcoholic additive on the left-hand side; latte macchiato L is shown on the right-hand side with the flavoring caramel, shown by caramel cubes K. The user can also scroll to further beverage variants by arrow buttons P and P' and can select the desired beverage variant by touching lightly on the corresponding graphical symbol.

As an alternative to this, a back element 8 is shown in the bottom region. The user can return to the previous representation, in the present case consequently to the menu selection region 4 shown in FIG. 2, as can be seen by the arrow to the left and is additionally understandable in an intuitively simple manner.

FIG. 4 shows a preview region 6, as described, for example, in relation to the menu selection mode 2 in FIG. 1.

The selected beverage variant, in the present case cappuccino C, is shown graphically in said preview region 6. The user consequently directly understands the beverage variant he selected in the preview region 6 and can correct it, where applicable, by actuating a back element 8 already described.

In addition, the chosen beverage variant, in the present case cappuccino, is described once again in plain text in the upper region. In this exemplary embodiment, the preview region additionally includes an option region which is shown on the left and in which, in the present case, the size of the beverage to be dispensed can be selected between three sizes—large, medium and small—by touching the corresponding cup symbol in the desired size. In addition, flavorings, which the user can select by touching lightly on the corresponding graphic symbol, are shown on the right-hand side and can consequently be added to his beverage (see also description regarding FIG. 8).

A start element 9, which is additionally provided with an explanatory reference "press to prepare your drink", is provided in addition.

The user can then pass to the preceding display, in the present case to the beverage variant selection region 5 according to FIG. 3, once again by actuating the back element or can start the dispensing of the selected beverage variant by actuating the start element 9.

Due to the graphically supported user guidance, in the case of the method according to the invention, the user is consequently guided in an intuitively understandable and enjoyable manner to select a desired beverage variant, the risk of wrongly selecting a non-wanted beverage variant being reduced in a considerable manner, in particular by the graphic representation in the preview region 6 and by the possibility of correcting, where applicable, a wrong selection by actuating the corresponding back elements 8.

Figure 5:
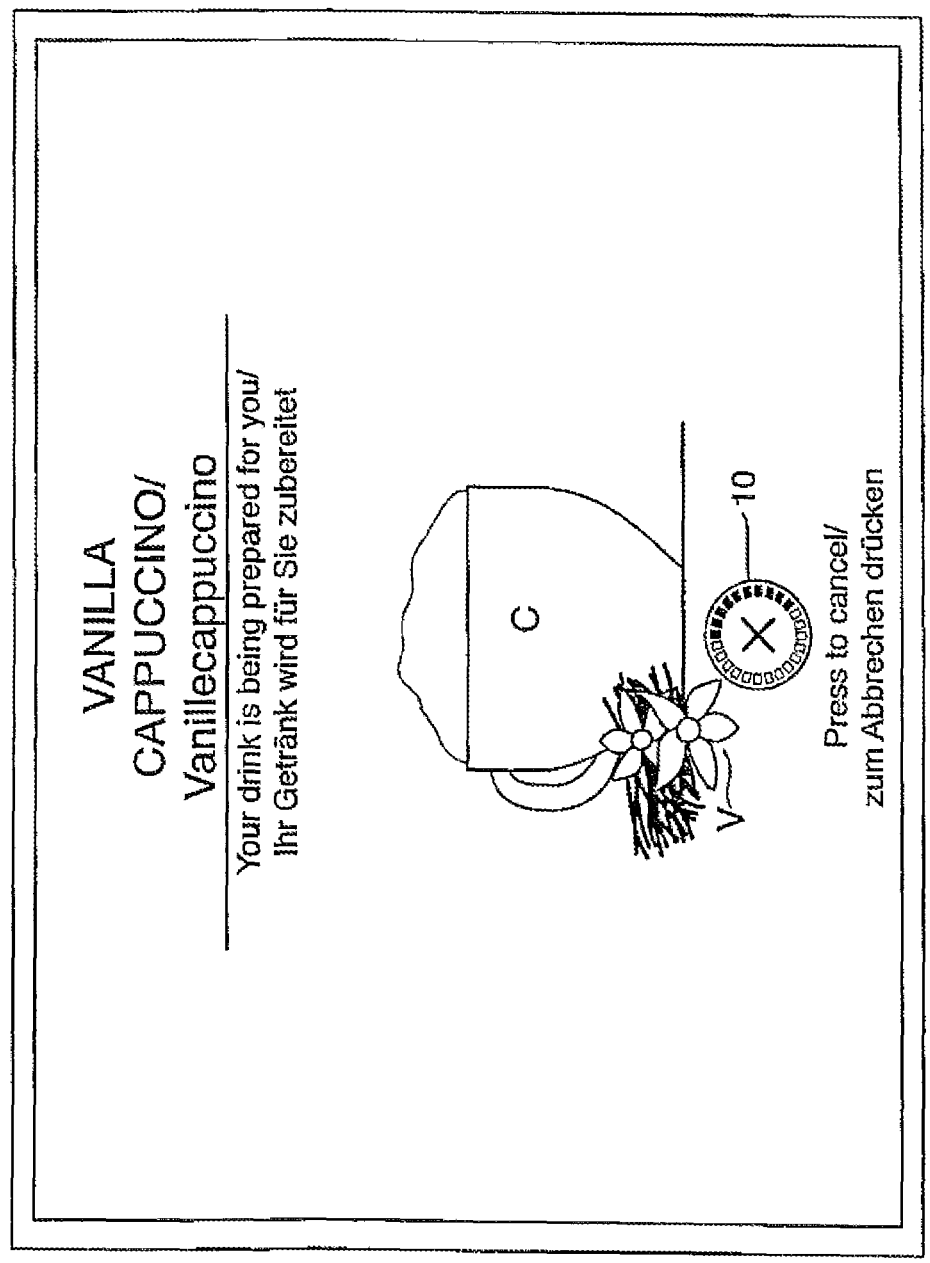
FIG. 5 shows a further part view of an exemplary embodiment of a preview region.

FIG. 5 shows the screen display during the beverage preparation. In this connection, the beverage variant being prepared at that moment is once again shown graphically and in plain text (in the present case cappuccino with vanilla flavoring V). In the upper region, the user is additionally informed that the beverage is now prepared and dispensed (your drink is being prepared for you).

In this exemplary embodiment, a cancel element 10 is shown once again in the bottom region and is shown with a corresponding explanatory reference (press to cancel). Should, against expectation, the user want to cancel the beverage preparation and/or dispensing, he can actuate the symbol X of the cancel element 10 in an intuitively simple manner, whereupon the beverage preparation and/or dispensing is cancelled.

In addition, the cancel element 10 comprises a ring-shaped progress bar with several segments such that the user is informed of the progress during the beverage preparation in the manner known per se of a progress bar and in particular can estimate the length of time to the conclusion of the beverage preparation and the dispensing and can understand it intuitively in a visual and simple manner.

Figure 6:
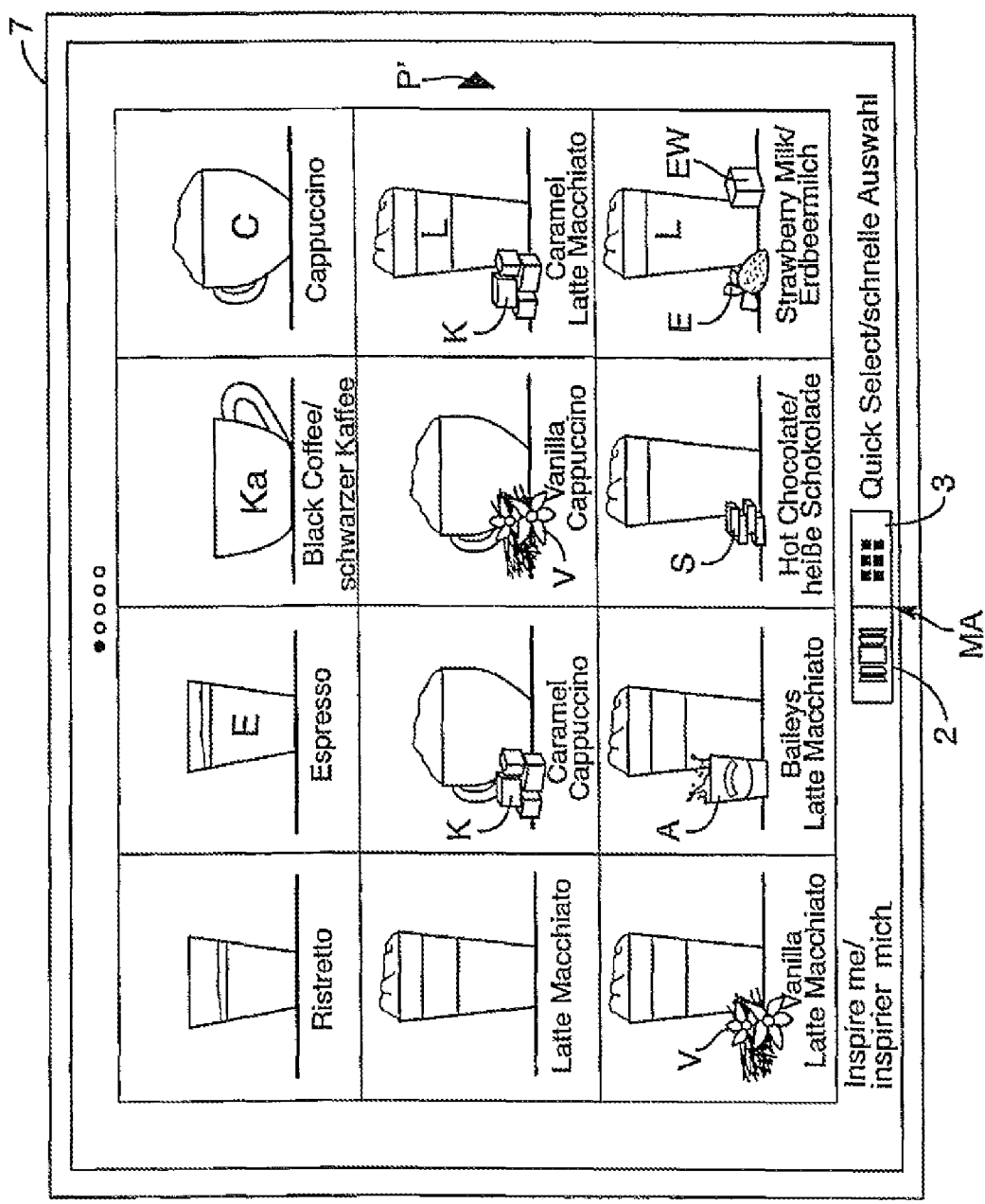
FIG. 6 shows a part view of a further exemplary embodiment of a selection region of a quick selection mode.

FIG. 6 shows an exemplary embodiment of a quick selection region 7 as is described in relation to the quick selection mode 3 in FIG. 1.

The quick selection region 7 shows in the manner of tiles a plurality of different beverage variants which, as described beforehand, already indicate the beverage variant, for example, by representing latte macchiato L, cappuccino C or coffee Ka or expresso in corresponding receptacles as well as, for example, any flavorings by graphical symbols such as, for example, caramel cubes K, vanilla blossoms C, alcohol additives A, chocolate additive S or strawberry flavoring by a strawberry E.

In addition, on the right-hand bottom side with the representation of a latte macchiato L with strawberry additive E, it is shown by an ice cube EW in a manner that is intuitively simple to understand that said beverage variant is a cold beverage, in the present case a cold latte macchiato with strawberry flavoring additive.

A selection element MA for switching between menu selection mode 2 and quick selection mode 3 is shown in the bottom region, as already described for FIG. 2.

It is possible to scroll back and forth between several tile-like representations by arrow buttons (shown in FIG. 6: arrow button P') such that a plurality of beverage variants can be shown in the quick selection mode.

Figure 7:
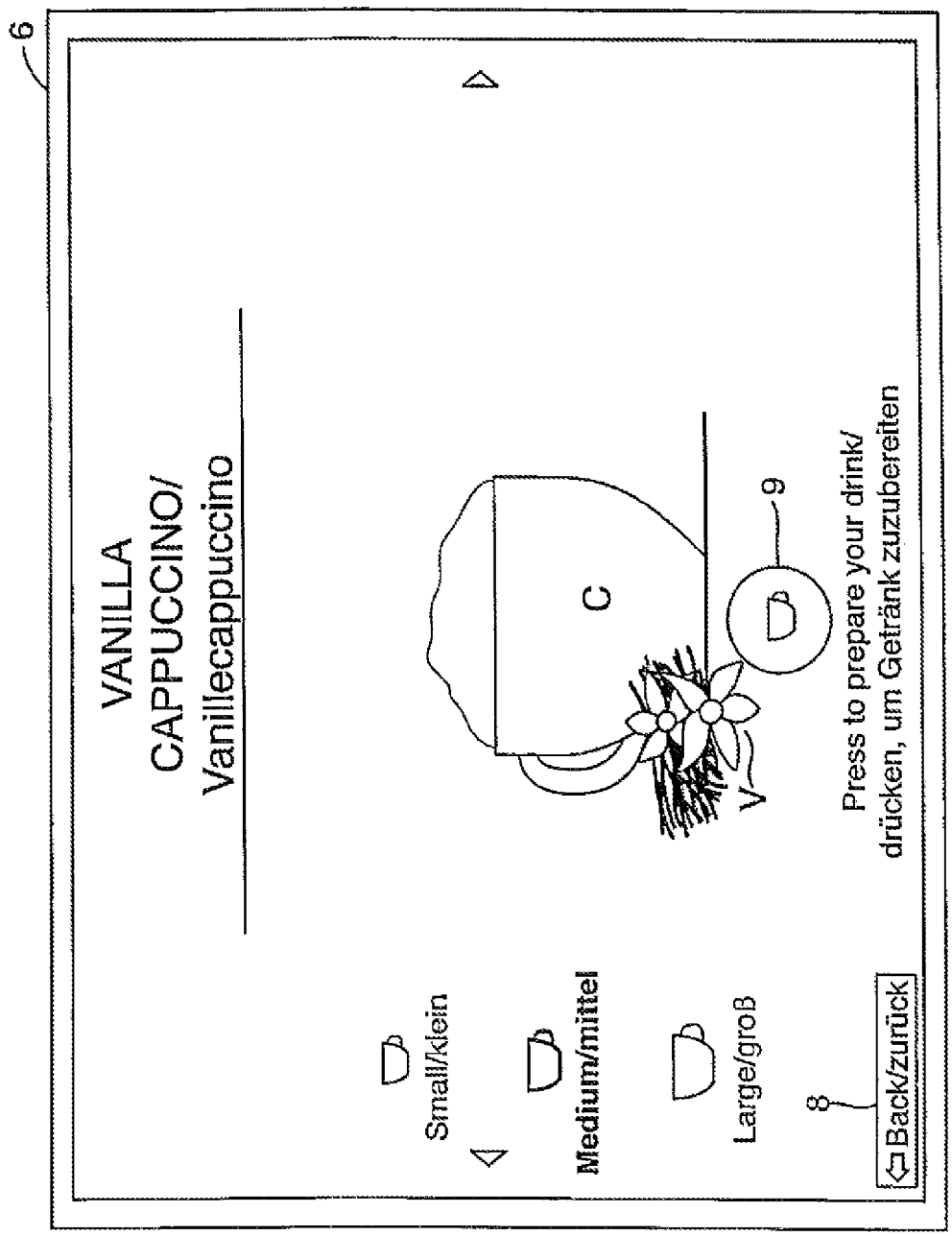
FIG. 7 shows a further exemplary embodiment of a preview region of a quick selection mode.

FIG. 7 shows a further exemplary embodiment of a preview region 6, as described in FIG. 1 for the quick selection mode 3.

The preview region 6 differs from the preview region of the menu selection region 2 shown in FIG. 4 in that in the preview region according to FIG. 7 only the size of the selected beverage can be changed, for the beverage variant is already bindingly fixed with all components in the quick selection mode and purely the size is still able to be selected prior to beverage preparation.

In the preview region of the menu selection mode 2 according to FIG. 4, in contrast there is additionally still the choice between one or several additives, in the present case vanilla flavoring V, alcoholic beverage A, or caramel additive K.

Figure 8:
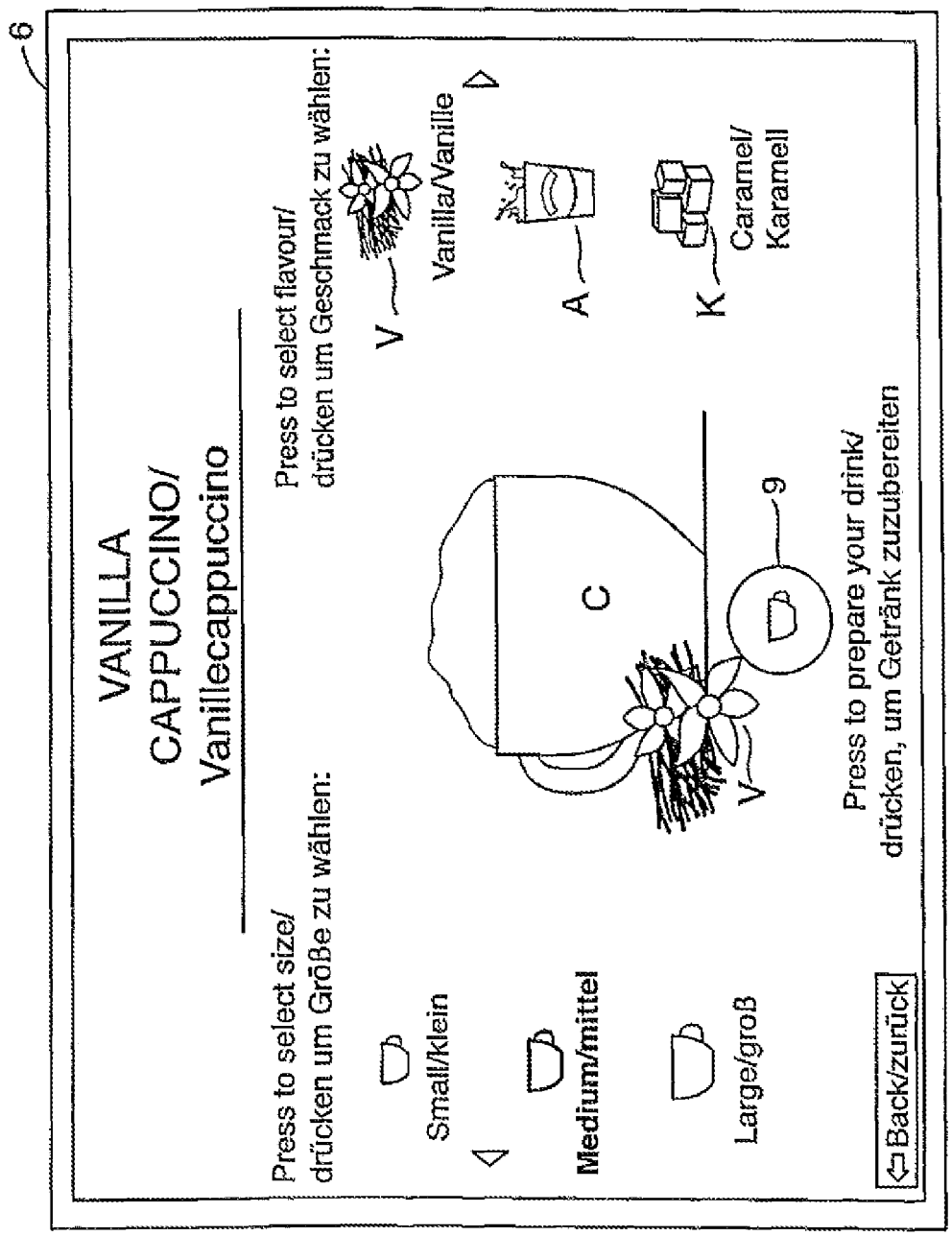
FIG. 8 shows the preview region shown in FIG. 4 where a flavoring has additionally been selected.

FIG. 8 shows a further state of graphical representation of the preview region 6 shown in FIG. 4: if the user, for example, by touching lightly on the vanilla blossom V on the right-hand screen edge, selects that the additive of vanilla flavoring is desired, a vanilla blossom V is additionally displayed in the preview region 6 with the representation of the cappuccino C such that the user recognizes in a manner that is intuitively simple to understand that the selected beverage variant now includes cappuccino C with vanilla flavoring V.

Figure 9:
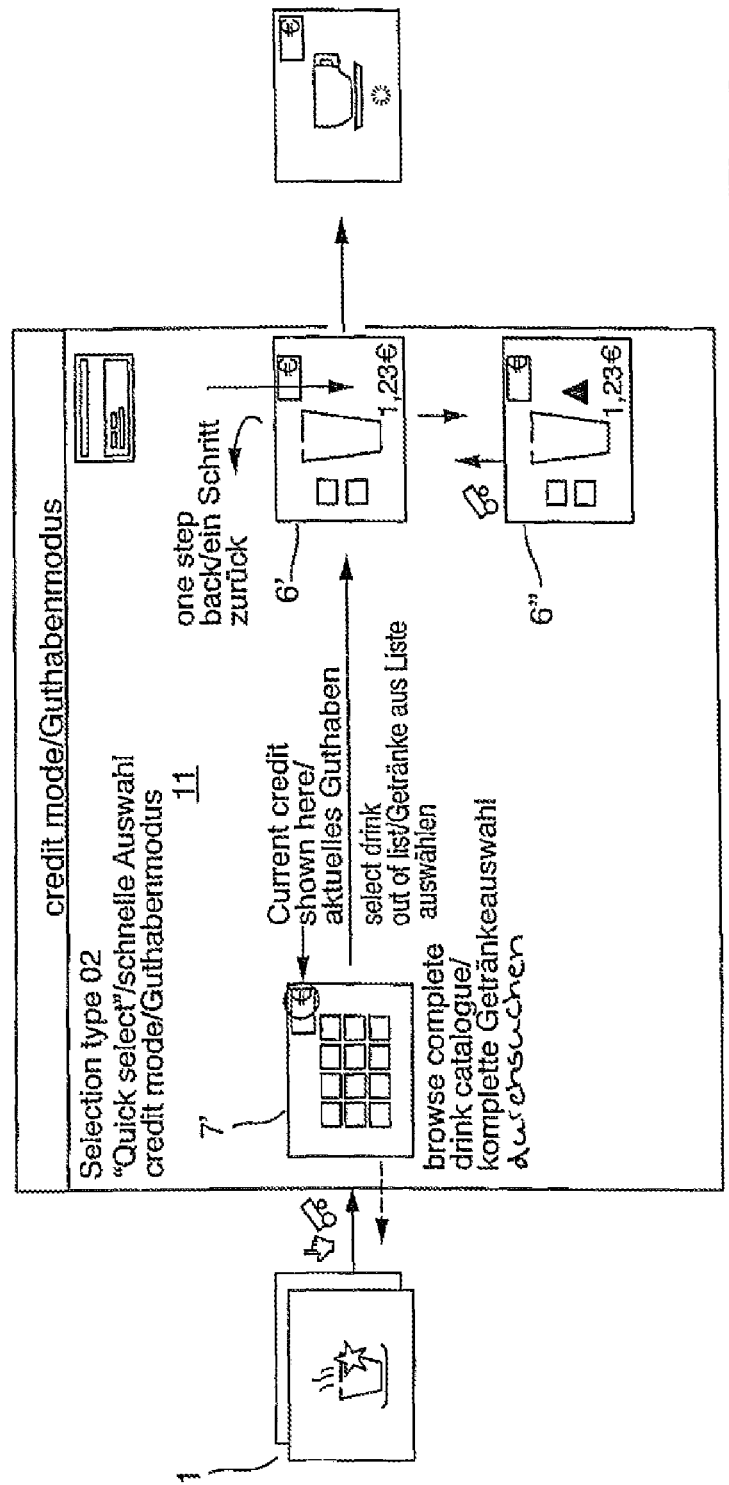
FIG. 9 shows a schematic flow diagram of an exemplary embodiment of a credit mode with quick selection mode.

FIG. 9 shows an exemplary embodiment where a quick selection mode according to the previously described quick selection mode 3 is realized as credit mode 11.

Here too, as described for FIG. 1, an idle mode 1 is shown. By touching lightly on the screen or by inserting money into the beverage preparation machine, a quick selection region 7' is shown in credit mode. This is explained in more detail by way of FIG. 10.

After successfully selecting a beverage variant in the quick selection mode 7', a preview region 6' is displayed which is realized analogously to the previously described preview region 6 according to quick selection mode 3 in FIG. 1. In addition, however, the price of the selected beverage variant is displayed and a corresponding visual display follows insofar as the price of the selected beverage variant exceeds the amount already paid such that the user is able to make another selection by a corresponding back element or after inserting a corresponding amount of money is able to pay a sufficient beverage price and can start the beverage preparation by actuating a start element. FIG. 10 shows the quick selection region 7' in credit mode development. The representation is effected analogously to the beverage selection region according to FIG. 6.

In addition, however, the price of the respective beverage variant is provided at the top right-hand corner of each tile and in the top region the shortfall (missing) for a selected beverage variant is already provided such that the user, even at this stage, is able to insert the amount of money still missing. As soon as a sufficient amount of money has been paid, the user passes to the previously described preview region 6' and there, where applicable, is still able to change the size of the beverage. If the price is increased by the selection of the beverage size and the amount already paid is insufficient, as described beforehand, the user is made aware in a modified preview region 6" by a corresponding display that either a more favorable beverage variant, such as for example a smaller beverage size, has to be selected or a sufficient amount of money has to be paid by correspondingly inserting more money in order to enable beverage preparation.

Figure 11:
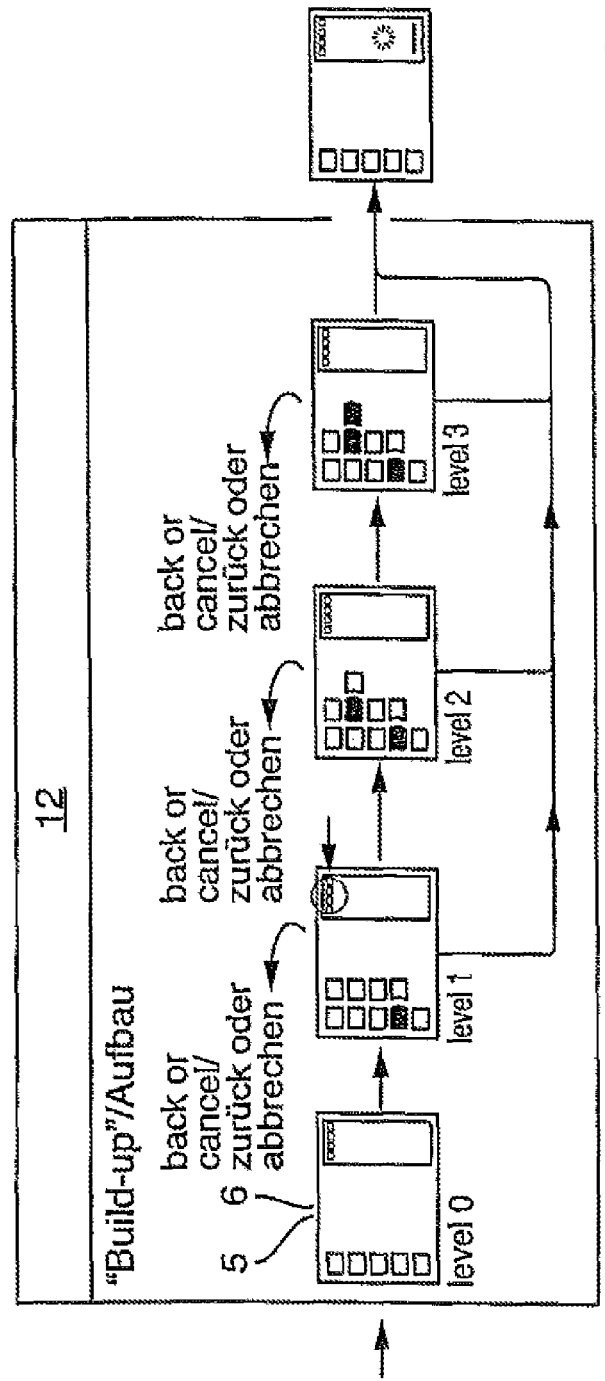
FIG. 11 shows a schematic flow diagram of an exemplary embodiment of a component selection mode.

FIG. 11 shows a schematic representation of a flow diagram of a component selection mode (build-up).

Here too, the user passes from an idle mode (not shown) into a beverage selection region 5. In contrast to the previously described menu selection mode 2 and quick selection mode 3 where the preview region 6 is shown in each case after the beverage selection region 5, in the case of the component selection mode 12 shown in FIG. 11 the beverage variant selection region 5 and the preview region 6 are shown simultaneously. This is explained in more detail below by way of FIGS. 12 to 15.

By selecting corresponding components, the user passes to different selection levels (levels 1 to 3 shown as examples in FIG. 11) (level 1, level 2, level 3). The beverage preparation and dispensing can be started directly at each level by actuating a start element or it is possible to return to the previous display by actuating a back element or it is possible to return to the basic level (level 0) by actuating a cancel element.

Figure 12:
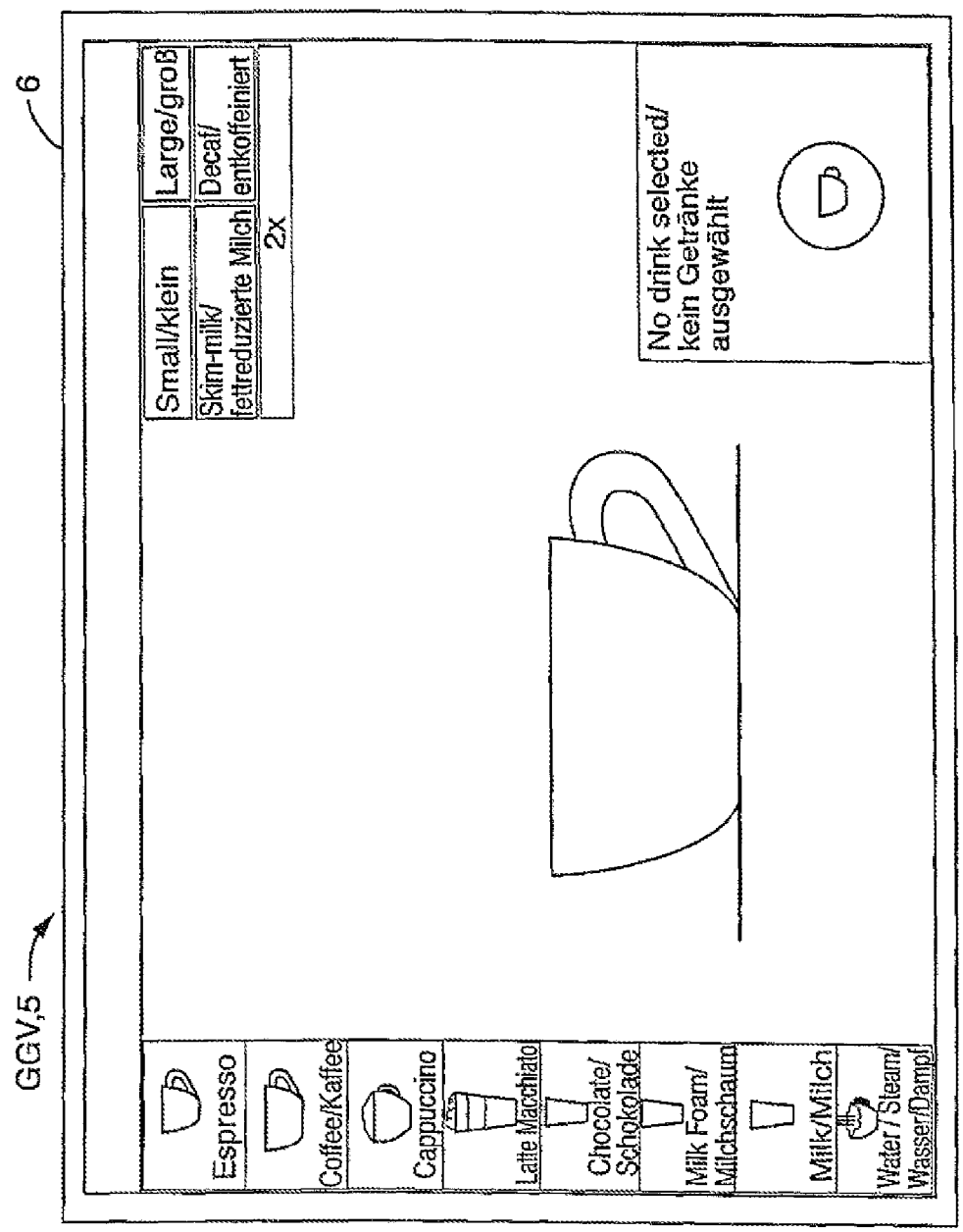
FIG. 12 shows an exemplary embodiment of a selection region and preview region of the component selection mode shown in FIG. 11.

FIG. 12 now shows the basic level—level 0—of the component selection mode 12. In this connection, a plurality of beverage basic variants GGV are shown in a strip arranged on the left-hand edge, in the present case expresso, coffee, cappuccino, latte macchiato, chocolate, milk foam, milk and water/steam. The preview region is located in the central region, in the present case according to FIG. 12 displaying a neutral cup as no selection has yet been made. The beverage basic variants GGV in the basic level according to FIG. 12 consequently provide the beverage selection region 5.

Figure 13:
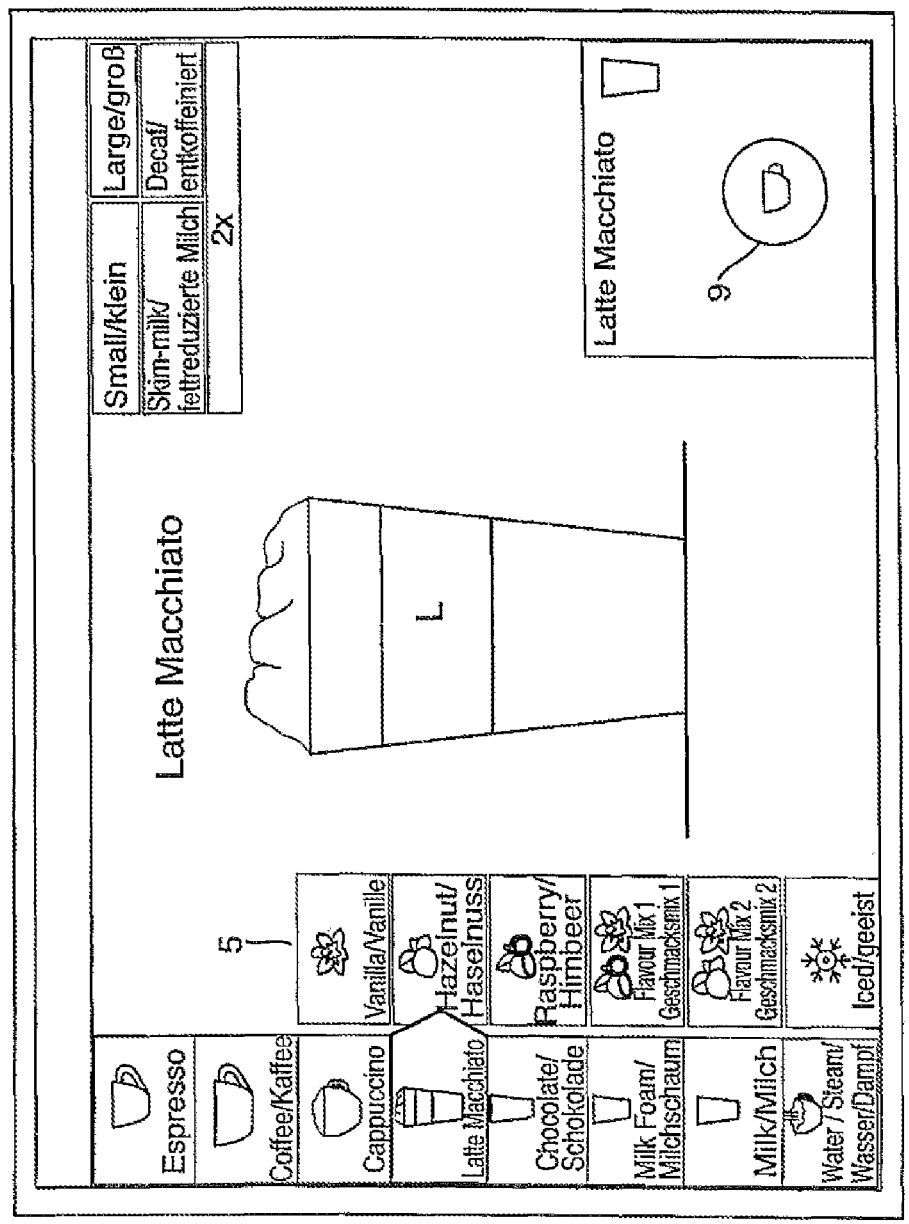
FIGS. 13 to 15 show different processing states when operating the component selection mode shown in FIG. 12.

By touching lightly on a corresponding tile of a beverage basic variant, such as for example the tile for latte macchiato, the user can then select said beverage basic variant. As a result of selecting a beverage basic variant in the selection region 5, the user passes into level 1 which is shown in FIG. 13. The basic variant chosen is then shown graphically in the preview region 6, in the present case latte macchiato L with the characteristic layer structure and a characteristic glass.

At the same time, the input strip is expanded in the manner of a drop-down menu on the left-hand side, in which strip the selected basic variant, in the present case the tile for latte macchiato, is graphically highlighted, in the present case by the representation of an arrow and the subset of additive variants provided for said beverage basic variant is displayed in a second selection column which now shows the beverage variant selection region 5. In the present case, consequently, for latter macchiato it is possible to select a vanilla flavoring additive (vanilla), shown by a vanilla blossom, a hazelnut flavoring additive (hazelnut) shown by hazelnuts and in an analogous manner a raspberry additive (raspberry) as well as a combination of raspberry and vanilla (flavor mix 2) as well as a cooled variant (iced) shown by a snow flake.

It can already be seen in the case of said beverage variant selection region 5 according to FIG. 13 that the user is only shown a limited selection. For example, in the present case no strawberry flavoring additive can be selected or the combination of hazelnut and raspberry is not possible. As a result, unfavorable flavoring combinations can be suppressed by the operator.

In the representation according to FIG. 13, the user can then select a desired flavoring additive in the beverage selection region 5 by touching lightly on the corresponding tile, for example hazelnut, or as an alternative to this by actuating the start element 9 without selecting a further flavoring additive can have latte macchiato prepared and dispensed directly at level 1 without a flavoring additive.

Figure 14:
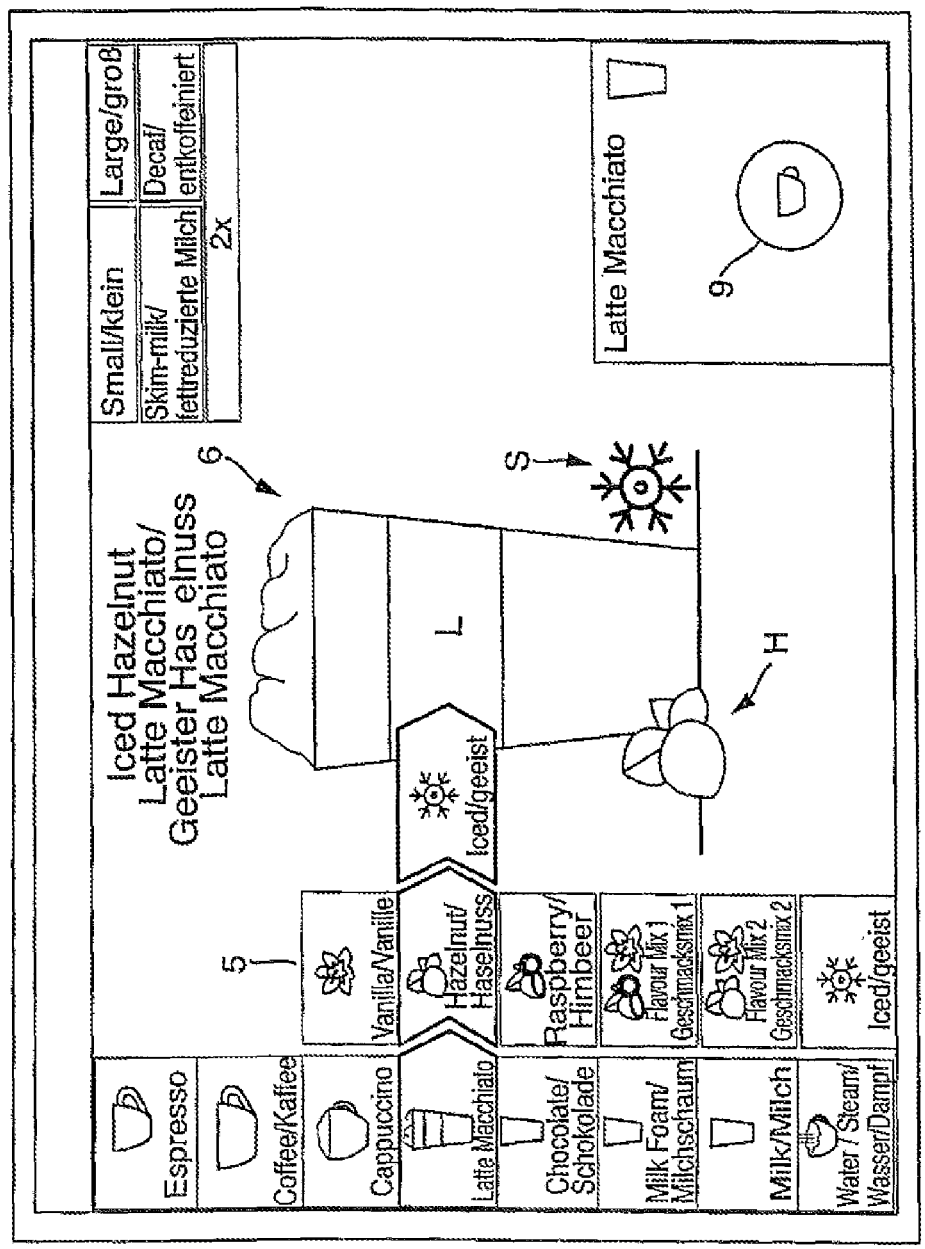

In the present operating example, the user selects the tile hazelnut and consequently passes in the representation according to FIG. 14 to a level 3 in component selection mode. In this level, a third column is shown in which further variation possibilities to the selection of latte macchiato and hazelnut already made are possible. In the present case, in the beverage selection region 5 according to level 3 in the representation according to FIG. 14 only "iced" is shown, symbolized by a snow flake. The user can also start the preparation directly by selecting the start element 9 at this level, in the present case consequently latte macchiato with hazelnut flavoring. In the example shown in FIG. 14, the user has additionally chosen the iced variant. This selection is shown graphically in the preview region 6 by the snow flake S such that the user understands intuitively in the preview region 6 that the current selection of latte macchiato L with hazelnut flavoring H in iced form S has been chosen.

As can be seen in FIGS. 12 to 14, a modification of the size (small or large) can be made at each level by operating elements at the top on the right. Skimmed milk can also be selected or a decaffeinated variant (decaf). The dispensing volume can also be doubled (2x), for example when two beverages are to be dispensed at the same time in two beverage containers.

Figure 15:
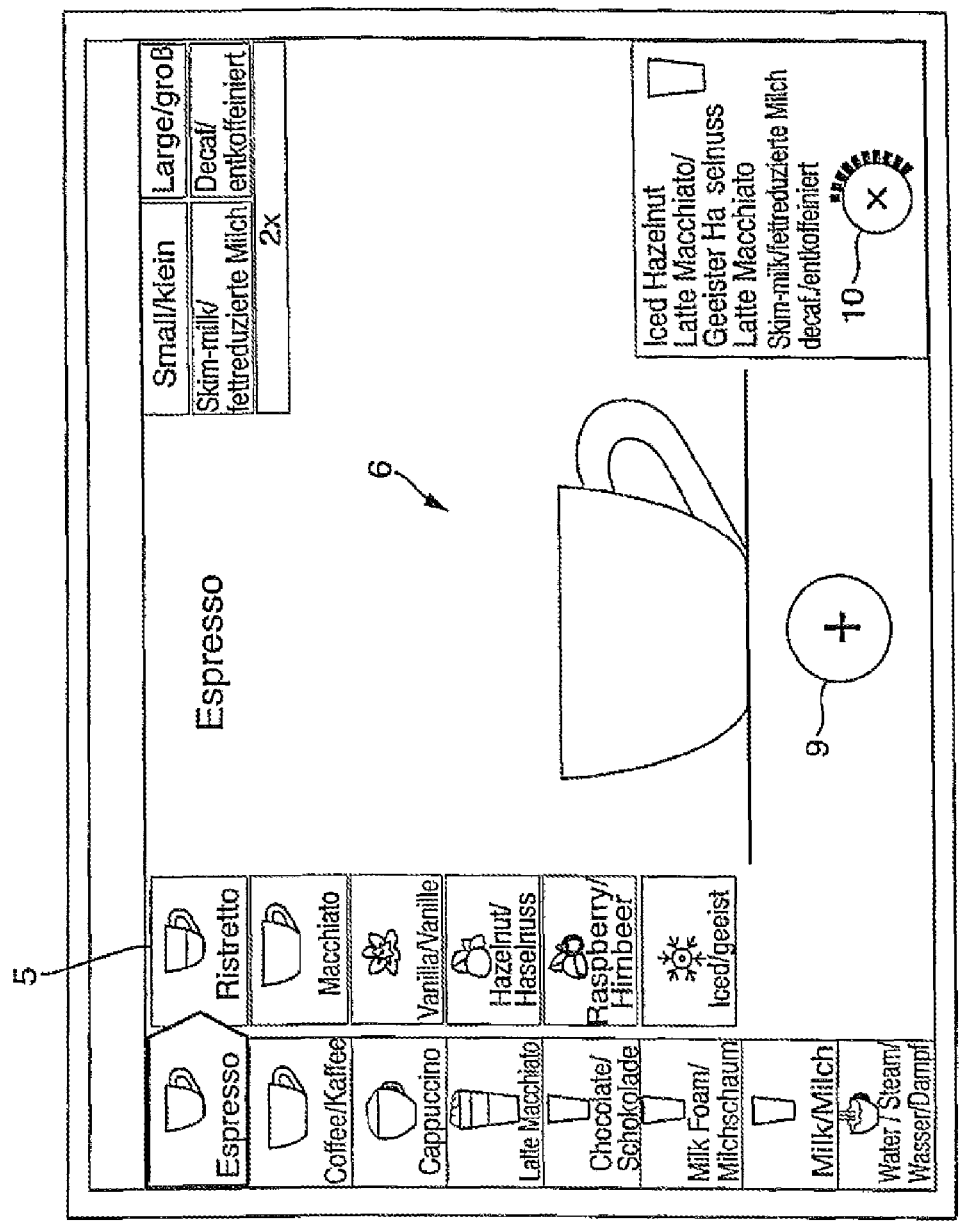
Figure 16:
FIG. 16 shows a further exemplary embodiment of the component selection mode shown in FIG. 12 with a job list shown in a job list region.

FIGS. 15 and 16 show the exemplary embodiment of a method with a job list by way of the component selection mode:

FIG. 15 shows a component selection mode with beverage variant selection region 5 and preview region 6, analogously to the realizations according to FIGS. 12 to 14.

In the case of the exemplary embodiment shown here, the user has selected according to FIG. 14 the start element 9 by touching lightly on it such that the preparation and dispensing of the chosen beverage variant latte macchiato with hazelnut in iced form is started.

In the development of the exemplary embodiment of the component selection mode with a job list described here, a representation according to FIG. 15 is then effected in which the beverage currently being prepared is described at the bottom on the right, and additionally a possibility to cancel the beverage preparation and dispensing is provided by a cancel element 10, described already in regard to FIG. 5, with a ring-shaped, segmented progress bar.

The essential point in the development with a job list is that the user is able to make a selection in the previously described component selection mode during the beverage preparation and dispensing. In the representation according to FIG. 15, the user has already chosen "expresso". In this exemplary embodiment the start element 9 is shown as "+" in job list mode. After selecting the beverage variant "expresso", the user now recognizes intuitively that he can add said further beverage variant to the job list by actuating the start element 9.

A job list is shown on the right-hand side in FIG. 16 where, according to the representation in FIG. 15, the first beverage variant latte macchiato with hazelnut in iced form is still being prepared and dispensed, the user has then, however, already selected two large expressos (expresso large 2x), then an iced cappuccino with skimmed milk in the large variant (iced cappuccino large/skim-milk) and a cappuccino with raspberry flavoring additive in iced form (iced raspberry cappuccino).

These beverage variants, composed in each case in the component selection mode and selected by actuating the start element 9, are shown one above another in the job list at the right-hand edge such that the user understands intuitively in a simple manner the order in which the individual beverages are prepared and dispensed and in particular can put corresponding receptacles under an outlet of the beverage preparation machine.

Once a beverage has been completely dispensed, the associated bottom-most tile is faded out and the remaining tiles of the job list are moved down. In the exemplary embodiment shown in FIG. 16, once the dispensing of the iced latte macchiato with hazelnut flavoring has been completed, the tile for 2x large expresso is consequently moved to the bottom right-hand edge and the tiles located above it are correspondingly moved down. The beverage dispensing of the next beverage, however, does not begin until the user actuates the corresponding tile once again such that there is enough time remaining, where necessary, for the user to provide the corresponding receptacle. The user can also activate an arbitrary tile in the job list by touching it lightly, whereupon a cancel element "X" 10 is displayed and the user can consequently delete arbitrary elements from the job list by actuating the cancel element.

By touching lightly on a tile and moving it, the user is also able to move the same in a manner known per se between tiles that are located above it or below it in order to change the dispensing order.

Figure 17:
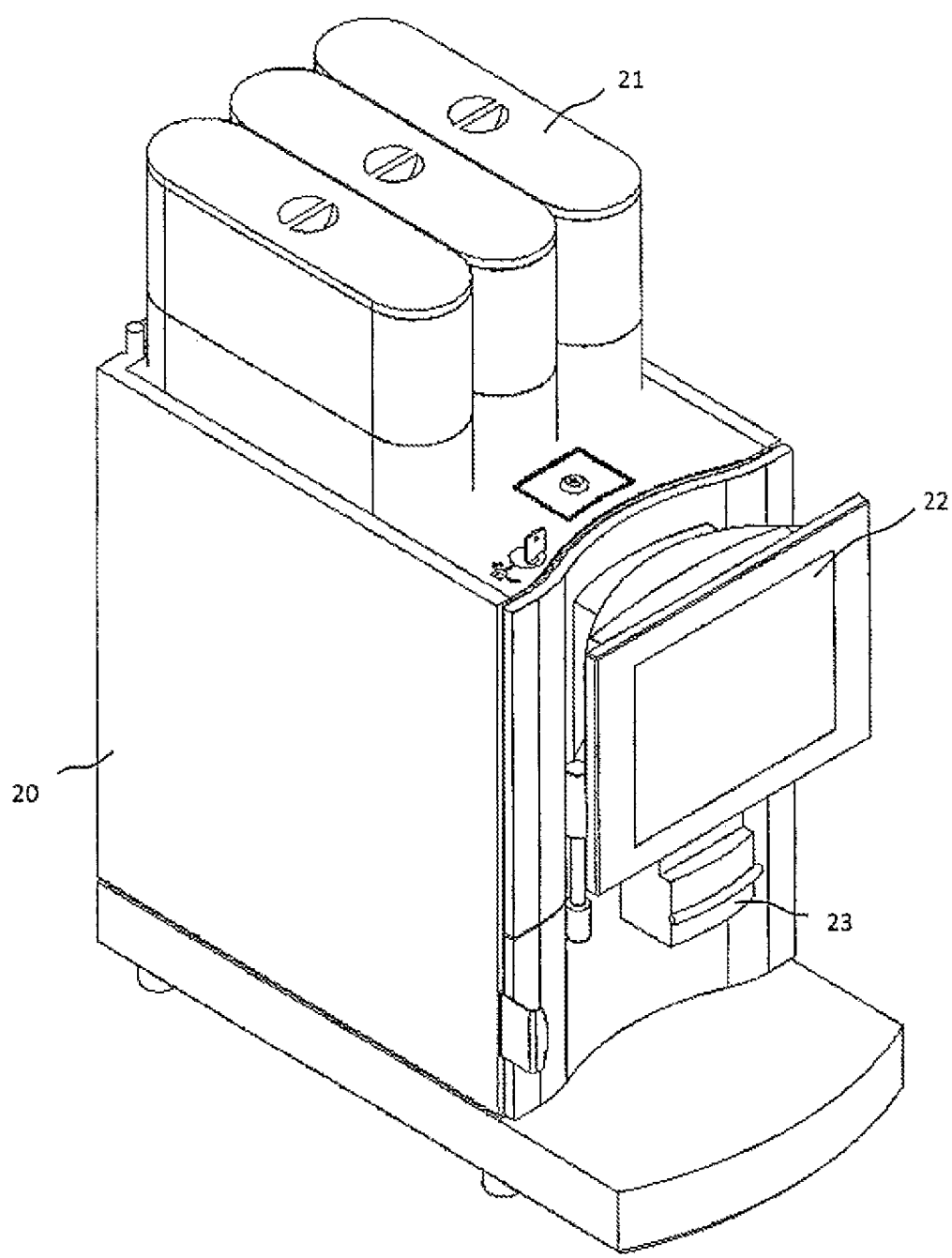
FIG. 17 shows an isometric view of a beverage preparation machine according to the invention.

FIG. 17 shows a beverage preparation machine according to the invention in the form of a microprocessor-controlled automatic coffee machine 20. An associated block diagram which shows a schematic representation of the function units of the automatic coffee machine 20 can be found in FIG. 18.

The automatic coffee machine 20 has three integrated coffee grinders for the individual preparation of coffee specialties such as, for instance, ristretto, expresso, café creme or brewed coffee. The coffee beans for this originate from one of the bean containers 21. An integrated brewing system 25 with a metal brewing unit and piston heating is provided with corresponding brewing inserts for preparation of classic expresso, brewed coffee and other coffee specialties. The respective coffee beans are automatically freshly ground after a beverage is selected. In this way, coffee specialties can be prepared freshly and when required in single or double cups. After brewing, the dry coffee grounds are collected in the integrated grounds drawer (not shown). The grounds drawer is secured against overfilling.

The beverage dispensing is effected by a coffee outlet 23. An automatic height adaptation of the coffee outlet enables the use of all common cups 33, drinking vessels and pots. As an option, a cup sensor detects whether a cup 33 is present under the coffee outlet. If the cup is missing, the product choice is blocked. When a cup 33 is placed below, a rinse function for cleaning the automatic coffee machine is suppressed. To fill larger coffee pots, a pivotable pot outlet can be mounted as an option.

By adding fresh milk by an integrated milk system 26, 27, 28, further products such as milky coffee, latte macchiato, cappuccino, cold and hot milk as well as cold and hot milk foam can be prepared. An installed powder dosing device 29 offers the possibility of preparing hot chocolate or mixed beverages. The dosed or non-dosed provision of hot water is possible by a separate outlet (not shown) parallel to the output of coffee beverages.

The operator guidance, the adjustment and status function displays are effected on a touch screen 22 which in the exemplary embodiment comprises a screen diagonal of 10.4". For product representations there are up to six individually definable menu cards in the user guidance of the device control unit. For operating by touching lightly or tapping, there are up to five pages per menu card, in each case with 6, 12 or 20 product keys per page. These can be occupied by pre-programmed images and arranged individually. The menu cards offer the possibility of showing, for example, seasonal summer and winter beverages, or of showing the differentiation according to receptors such as, for example, classic or flavor beverages as well as cold beverages. In the optional accounting mode, the product price and a credit display, where applicable, is effected on the touch screen 22.

An integrated media pool offers the possibility of uploading images and advertisements by USB interface and of allowing them to fade-in on the screen in non-working periods. As an option, an energy-saving mode for the screen 22 can be activated in non-working periods.

The coffee grinders 24 installed in the automatic coffee machine 20 are provided with ceramic grinding disks and transparent, removable bean containers 21. The content of the bean containers 21 is visually monitored. When the minimum fill level is fallen below, the automatic empty signal is effected on the touch screen 22 and the corresponding product reference is blocked. In addition, the automatic coffee machine 20 enables the supply of ground coffee by a manual charging hopper (not shown).

The automatic coffee machine 20 additionally has an integrated powder dosing means 29 for chocolate powder or other commercially available instant flavors. The content of the relevant hopper 30 is also visually monitored. When the minimum fill level is fallen below, the automatic empty signal is effected on the touch screen 22 and the corresponding product reference is blocked. A motor-operated mixer system 31 is responsible for mixing water and chocolate powder or instant powder in an even manner. The finished beverage is dispensed by the coffee outlet 23. A combination of chocolate or instant beverage and coffee products is also possible.

The milk system comprises a cooling unit 26 with an integrated milk pump 27 which takes care of dosing the milk volume in an optimum manner. The fresh milk is heated up to a maximum of 80° in an instantaneous water heater 28, foamed by a milk foaming means 32 integrated in the coffee outlet 23 and dispensed in one operation with the coffee beverage. The moment the milk is dispensed is programmable individually prior to, with or after the coffee dispensing. The desired foam consistency from coarse/liquid to fine/stiff and the foam temperature up to a maximum of 65° is programmable individually per beverage. Different foam consistencies are also adjustable within the beverage. The preparation of cold and hot milk is possible as a result of the programmable milk temperature.

The control of the beverage preparation machine 20 is effected by a processor-controlled control device 35 with a design that is known per se. This control device has a central processing unit (CPU) 36 which is connected to a nonvolatile storage medium 37, for example an electronic storage medium or semiconductor drive which is also known as a solid state disk (SSD), a hard drive, a fixed value storage means (ROM or PROM) or the like, as well as to an operating storage means (RAM) 38 by a bus system. The CPU 36 is also connected by the bus system to the touch screen display 22 which serves as an input and output means. In addition, the control device 35 also has an external data interface, for example a USB, LAN or WLAN interface 39, as well as an internal interface 40, via which the control 35 is connected to the individual modules of the beverage preparation machine 20 in order to actuate said machine and to obtain from said machine status data and, where applicable, error messages, which is to be illustrated in a schematic manner by a double arrow in FIG. 18.

Figure 18:
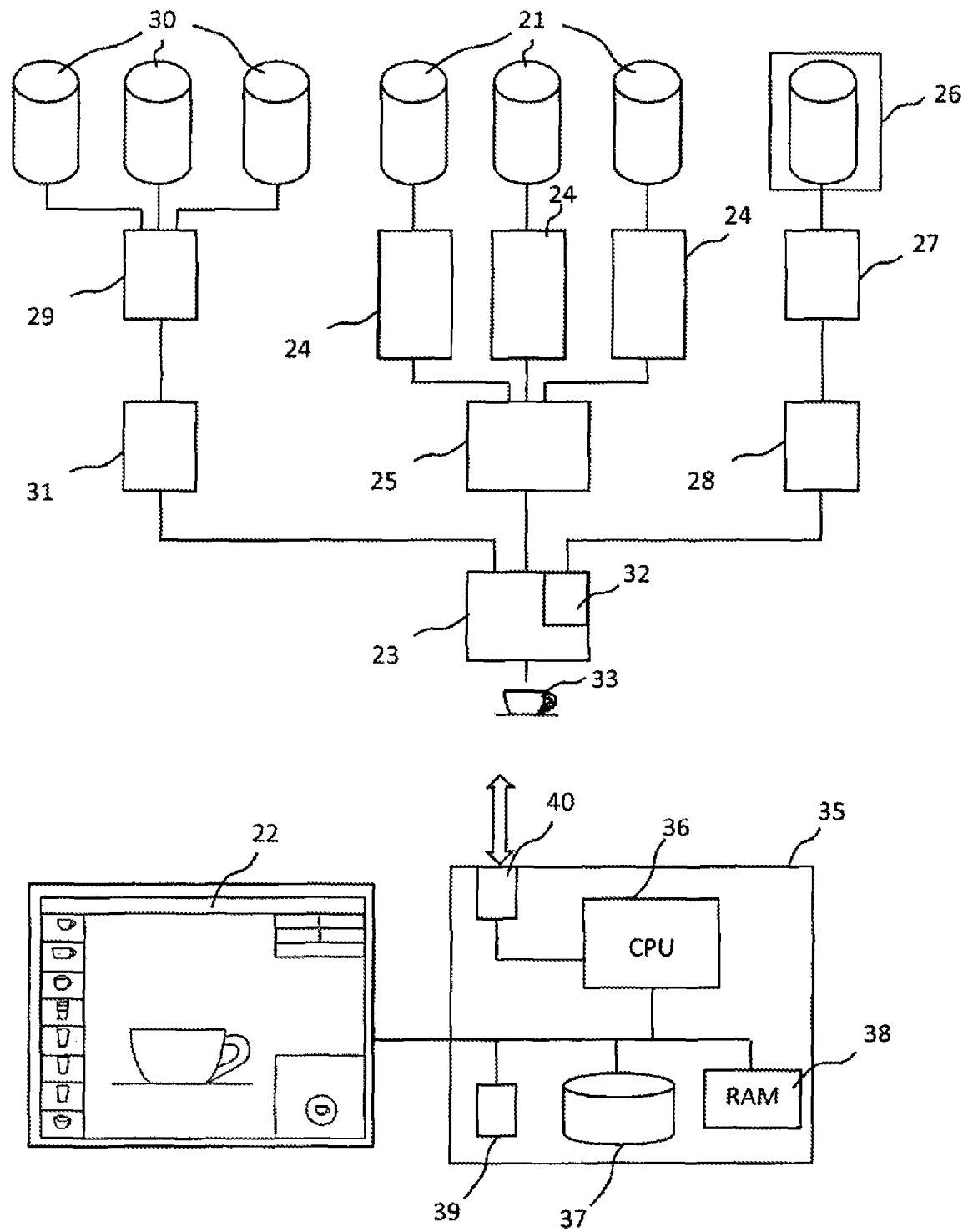
FIG. 18 shows a block diagram of the beverage preparation machine from FIG. 17.

The design of the control device 35 is shown in a roughly simplified manner in FIG. 18 and can include further components which are known per se, are usual within the framework of processor-operated control circuits and are commercially obtainable, such as, for instance, graphic processors, memory and periphery controllers and bus drivers among other things which are not shown here for better clarity.

The essential point is that the control device 35 is set up with programming technology in such a manner that it carries out a control program which is adapted to and suitable for controlling the beverage preparation machine 20 and, at the same time, for carrying out one of the methods described previously and claimed below. In particular, by the control device, when the corresponding control program is running, the touch screen display 22 is controlled in such a manner that in a selection mode at least one selection region and one preview region are shown graphically at least in part on the graphic display, a plurality of selectable beverage variants being shown graphically at least in part in the selection region, and a current selection made by the user in the selection region being shown graphically at least in part in the preview region.

When a start element is actuated by the user, the control device 35 controls the beverage preparation machine 20 in such a manner that the beverage variant shown in the selection region is prepared and is dispensed from the outlet 23.

The control device 35, in this case, can be operated in different operating modes. In a first operating mode, which is suitable for and adapted to, in particular, professional use and operation by employees in the gastronomy sector, the selection region and the preview region are shown simultaneously on the graphic display. In a second operating mode, which is suitable in particular for self-service of the beverage preparation machine 20 by end customers (self-assisted mode), in contrast once a selection has been made by the user the selection region is faded out and the preview region is then shown. A change between the operating modes is effected by a corresponding, where applicable, password-protected adjustment in the control program.

The invention claimed is:

1. A method for operating a beverage preparation machine, comprising:
   providing at least one coffee unit for dispensing coffee and an additive unit for dispensing a beverage additive,
   in a selection mode displaying a plurality of selectable beverage variants on an at least partially graphic display and upon a user selecting a beverage variant, controlling the beverage preparation machine with a controller such that the selected beverage variant is automatically prepared and dispensed from an outlet,
   in the selection mode showing graphically at least one selection region and one preview region at least in part, and showing graphically the plurality of selectable beverage variants at least in part in the selection region, and showing graphically a current selection made by a user in the selection region at least in part in the preview region,
   in at least a first operating mode of the beverage preparation machine, simultaneously showing the selection region and the preview region and when a start element is actuated by a user, controlling the beverage preparation machine such that the beverage variant shown in the selection region is automatically prepared and dispensed from the outlet, in the first operating mode using the selection mode, the plurality of selectable beverage variants is selectable by a user, and the beverage preparation machine showing the selected beverage variants as a job list in a job list region, and once the start element has been selected, controlling the beverage preparation machine such that the beverage variant shown first is prepared, and during the beverage preparation and dispensing, making a selection of further beverage variants available to a user by using the selection mode and upon selection of a further beverage variant, adding said further beverage variant to the job list.

2. The method as claimed in claim 1, further comprising, once the preparation of said beverage variant has been concluded, the controller fading out an associated representation and moving up subsequently selected ones of the beverage variants in the job list in each case a space in the job list.

3. The method as claimed in claim 1, further comprising showing a delete element for at least one element in the job list, and when the delete element is actuated by a user, the controller deleting the associated element in the job list from the job list.

4. The method as claimed in claim 1, further comprising changing an order of the beverage variants in the job list by a user using the at least partially graphic display.

5. The method as claimed in claim 1, further comprising in at least one second operating mode of the beverage preparation machine, once a user has made a selection, fading out the selection region and then showing the preview region.

6. The method as claimed in claim 5, wherein the beverage preparation machine is operable in either of the first or second operating modes and a switchover between the operating modes is controlled by a setting in a control program of the beverage preparation machine.

7. The method as claimed in claim 1, further comprising the selection mode in the first operating mode including a component selection mode in which a plurality of beverage basic variants which are selectable by a user is shown in the selection region and, when a beverage basic variant is selected, a plurality of beverage modifications relating to said selected beverage basic variant selectable by a user is displayed in a sub-selection region, with the beverage modifications including at least one of flavoring additives or preparation temperatures relating to the beverage basic variants.

8. The method as claimed in claim 7, further comprising showing the beverage sub-variants graphically assigned to the beverage main variants as a drop-down menu.

9. The method as claimed in claim 1, wherein the beverage preparation machine includes a touch screen, and the method further comprises effecting all operations by a user activating operating elements shown graphically on the touch screen.

10. The method as claimed in claim 1, further comprising displaying a pictogram of a next one of the beverage variants in the job list by the controller once the preparation of said beverage variant has been concluded, said pictogram being indicative of a receptacle to be used for said next one of the beverage variants.

11. A beverage preparation machine for preparing coffee beverages comprising:

at least one coffee unit for dispensing coffee, at least one additive unit for dispensing a beverage additive, an at least partially graphic display for displaying a plurality of beverage variants, a programmable controller configured to control the beverage preparation machine in dependence on a selection carried out by a user in such that a selected beverage variant is automatically prepared and dispensed from an outlet, the controller is further configured to show at least one selection region and a preview region on the graphic display at least in part in a selection mode, wherein a plurality of selectable beverage variants is shown graphically at least in part in the selection region and a current selection made by a user in the selection region is shown graphically at least in part in the preview region, the controller is further configured to show the selection region, and in the first operating mode using the selection mode, a plurality of beverage variants is selectable by a user and the controller is further configured to show the selected beverage variants as a job list in a job list region of the graphic display, and once the start element has been selected, to control the beverage preparation machine such that the beverage variant shown first is prepared, and the controller is further configured to allow a user during the beverage preparation and dispensing, selection of further beverage variants by using the selection mode and to add, upon selection of a further beverage variant, said further beverage variant to the job list.

12. The beverage preparation machine as claimed in claim 11, further comprising a touch screen as an operating element for signaling the controller.

\* \* \* \* \*